US010884542B2

(12) United States Patent
Aoki

(10) Patent No.: US 10,884,542 B2
(45) Date of Patent: *Jan. 5, 2021

(54) DISPLAY DEVICE

(71) Applicant: Japan Display Inc., Tokyo (JP)

(72) Inventor: Yoshinori Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,868

(22) Filed: Jan. 22, 2020

(65) Prior Publication Data

US 2020/0159360 A1 May 21, 2020

Related U.S. Application Data

(63) Continuation of application No. 16/552,451, filed on Aug. 27, 2019, now Pat. No. 10,579,189, which is a
(Continued)

(30) Foreign Application Priority Data

Sep. 16, 2016 (JP) .................................. 2016-181726

(51) Int. Cl.
*G06F 3/041* (2006.01)
*G09G 3/36* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
CPC .... G06F 3/0412; G06F 3/0414; G06F 3/0416; G06F 3/044; G06F 3/0445;
(Continued)

(56) References Cited

U.S. PATENT DOCUMENTS 6,819,389 B2 * 11/2004 Imayama .......... G02F 1/133345
349/138
9,888,582 B2 2/2018 Jo et al.
(Continued)

FOREIGN PATENT DOCUMENTS

JP 2009-058913 A 3/2009
JP 2015-122057 A 7/2015

*Primary Examiner* — Nelson M Rosario
(74) *Attorney, Agent, or Firm* — Michael Best & Friedrich LLP

(57) ABSTRACT

A display device includes a first organic insulating layer covering video signal lines; a first metal layer provided above the first organic insulating layer; a first conductive layer provided above the first organic insulating layer and connected to a switching element via a first contact hole; a first inorganic insulating layer covering the first conductive layer and the first metal layer; a second conductive layer provided above the first inorganic insulating layer and connected to the first metal layer; a second inorganic insulating layer provided above the second conductive layer; a third conductive layer provided above the second inorganic insulating layer and connected to the first conductive layer via a second contact hole; and a fourth conductive layer provided above the second inorganic insulating layer, connected to the first metal layers via a third contact hole, and connected to the second conductive layer via a fourth contact hole.

9 Claims, 31 Drawing Sheets

Related U.S. Application Data continuation of application No. 16/382,298, filed on Apr. 12, 2019, now Pat. No. 10,437,383, which is a continuation of application No. 15/683,871, filed on Aug. 23, 2017, now Pat. No. 10,303,290.

(51) Int. Cl.
  *G06F 3/044* (2006.01)
  *G09G 3/20* (2006.01)

(52) U.S. Cl.
  CPC ......... *G06F 3/0414* (2013.01); *G09G 3/2096* (2013.01); *G09G 3/3648* (2013.01); *G06F 2203/04103* (2013.01); *G09G 2354/00* (2013.01)

(58) Field of Classification Search
  CPC ........ G06F 2203/04103; G09G 3/2096; G09G 3/3648; G09G 2354/00
  See application file for complete search history.

(56) References Cited

U.S. PATENT DOCUMENTS

| | | |
|---|---|---|
| 2009/0059110 A1 | 3/2009 | Sasaki et al. |
| 2009/0194342 A1 | 8/2009 | Kuo et al. |
| 2010/0085320 A1 | 4/2010 | Kuwajima et al. |
| 2010/0110040 A1 | 5/2010 | Kim et al. |
| 2010/0231554 A1 | 9/2010 | Anno et al. |
| 2013/0328807 A1 | 12/2013 | Matsumoto |
| 2014/0160371 A1 | 6/2014 | Tokita et al. |
| 2015/0177880 A1 | 6/2015 | Shin et al. |

\* cited by examiner

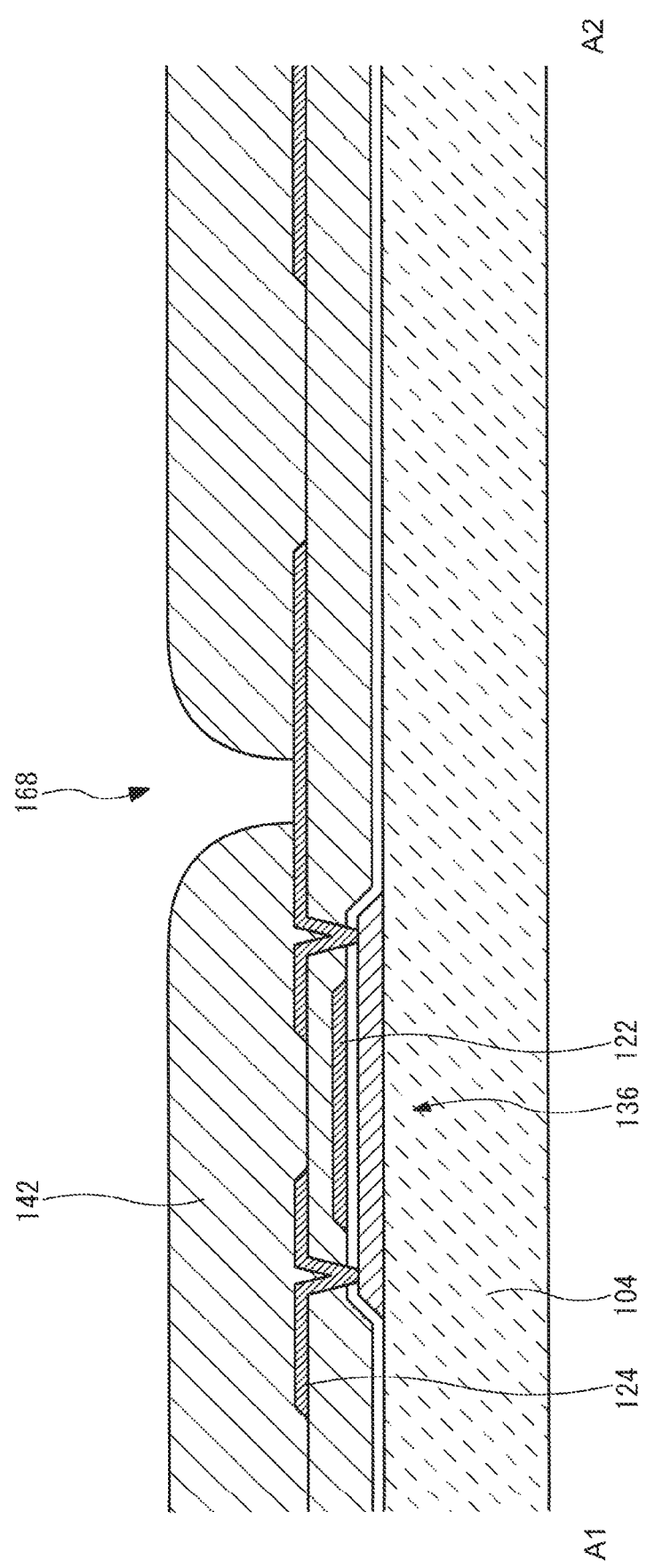

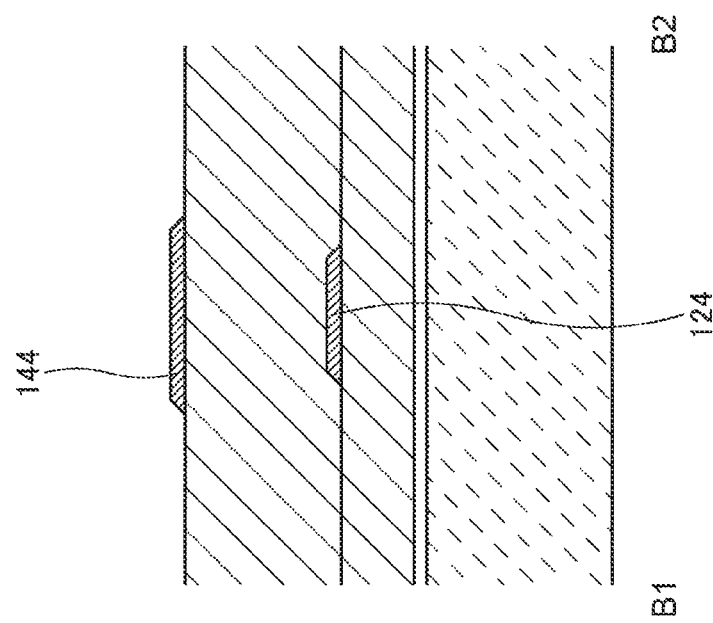

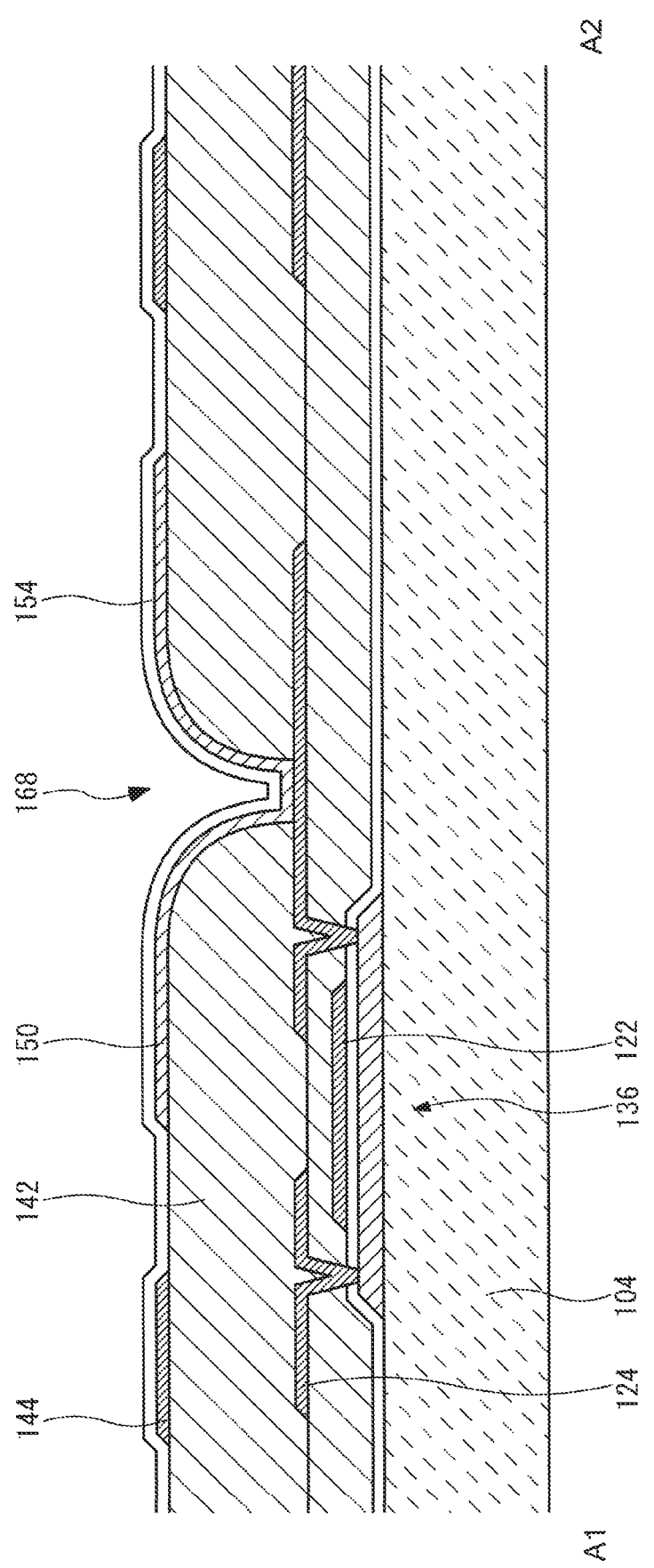

DISPLAY DEVICE

CROSS-REFERENCE TO RELATED APPLICATIONS

This application is a continuation of U.S. patent application Ser. No. 16/552,451 filed on Aug. 27, 2019, which, in turn, is a continuation of U.S. patent application Ser. No. 16/382,298 (now U.S. Pat. No. 10,437,383) filed on Apr. 12, 2019, which, in turn, is a continuation of U.S. patent application Ser. No. 15/683,871 (now U.S. Pat. No. 10,303,290) filed on Aug. 23, 2017. Further, this application is based upon and claims the benefit of priority from the prior Japanese Patent Application JP 2016-181726, filed on Sep. 16, 2016, the entire contents of which are incorporated herein by reference.

FIELD

The present invention relates to a display device including a touch sensor and a method for manufacturing the same.

BACKGROUND

In electronic devices such as mobile computers, personal computers, and car navigation systems, touch panels which allow data to be inputted by detecting a touch position of contact with a fingertip, a pen point, or the like while an image on a display screen of a liquid crystal display device or the like is being viewed have recently become widely used.

For example, Japanese Unexamined Patent Application Publication No. 2015-122057 discloses a display device including: a lower substrate; a gate line formed over the lower substrate so as to extend in a second direction (transverse direction); a gate insulating layer formed over the gate line; a data line formed over the gate insulating layer so as to extend in a first direction (longitudinal direction); a first protective layer formed over the data line; a pixel electrode and a signal line formed over the first protective layer in each pixel area; a second protective layer formed over the pixel electrode and the signal line; one electrode formed over the second protective layer so as to serve as a common electrode and a touch electrode; a liquid crystal layer formed over the electrode; and an upper substrate formed over the liquid crystal layer and provided with a black matrix, a color filter, and the like.

Further, for example, Japanese Unexamined Patent Application Publication No. 2009-058913 discloses a liquid crystal display device including: a liquid crystal display panel including a first substrate, a second substrate, and liquid crystals sandwiched between the first substrate and the second substrate, the liquid crystal display panel including a plurality of pixels arranged in a matrix. In the display device, the first substrate has a laminated structure of a first transparent electrode, a first insulating film, a second transparent electrode, a second insulating film, and a third transparent electrode in a transparent display area provided in at least part of each of the pixels, the first transparent electrode, the first insulating film, the second transparent electrode, the second insulating film, and the third transparent electrode being laminated in descending order of proximity to the first substrate, the first transparent electrode and the second transparent electrode are electrically insulated from each other and form a first retention capacitor via the first insulating film, and the second transparent electrode and the third transparent electrode are electrically insulated from each other and form a second retention capacitor via the second insulating film.

SUMMARY

A display device according to an embodiment of the present invention includes: a plurality of video signal lines that supply video signals to a plurality of pixels; a first organic insulating layer covering the plurality of video signal lines; a first metal layer provided above the first organic insulating layer so as to extend along any of the plurality of video signal lines; a first conductive layer provided above the first organic insulating layer in each of the plurality of pixels and connected to a switching element of the pixel via a first contact hole; a first inorganic insulating layer covering the first conductive layer and the first metal layer; a second conductive layer provided above the first inorganic insulating layer in each of a plurality of pixel groups and electrically connected to the first metal layer; a second inorganic insulating layer provided above the second conductive layer; a third conductive layer provided above the second inorganic insulating layer in each of the plurality of pixels and connected to the first conductive layer via a second contact hole; and a fourth conductive layer provided above the second inorganic insulating layer in each of the plurality of pixel groups, connected to any of a plurality of the first metal layers via a third contact hole, and connected to the second conductive layer via a fourth contact hole.

A method for manufacturing a display device according to an embodiment of the present invention includes: forming a plurality of video signal lines that supply video signals to a plurality of pixels; forming a first organic insulating layer that covers the plurality of video signal lines; forming, in each of the plurality of pixels, a first contact hole that reaches a switching element of the pixel; forming, above the first organic insulating layer, a first metal layer that extends along any of the plurality of video signal lines; forming, above the first organic insulating layer in each of the plurality of pixels, a first conductive layer that is connected to a switching element of the pixel via the first contact hole; forming a first inorganic insulating layer that coves the first metal layer and the first conductive layer; forming a second conductive layer above the first inorganic insulating layer in each of a plurality of pixel groups; forming, above the second conductive layer, a second inorganic insulating layer that covers the plurality of pixels; forming, in each of the plurality of pixels, a second contact hole that reaches the first conductive layer and a third contact hole that reaches the first metal layer; forming a fourth contact hole that reaches the second conductive layer; forming, above the second inorganic insulating layer in each of the plurality of pixels, a third conductive layer that is connected to the first conductive layer via the second contact hole; and forming, above the second inorganic insulating layer in each of the plurality of pixel groups, a fourth conductive layer that is connected to the first metal layer via the third contact hole and connected to the second conductive layer via the fourth contact hole.

BRIEF DESCRIPTION OF DRAWINGS

FIG. 13A is a cross-sectional view illustrating a method for manufacturing a pixel of a display device according to an embodiment of the present invention;

FIG. 15B is a cross-sectional view illustrating a method for manufacturing a pixel of a display device according to an embodiment of the present invention;

FIG. 16A is a cross-sectional view illustrating a method for manufacturing a pixel of a display device according to an embodiment of the present invention;

DESCRIPTION OF EMBODIMENTS

A configuration of a display device according to an embodiment of the present invention and a method for manufacturing the same are described in detail below with reference to the drawings. It should be noted that a display device of the present invention is not limited to the embodiment described below but may be implemented in various modifications. Further, for convenience of explanation, the dimensional ratios of the drawings may be different from actual ratios, and some of the components may be omitted from the drawings.

In manufacturing a so-called in-cell type touch panel integrally formed with a liquid crystal display device and a touch sensor as in the invention described in Japanese Unexamined Patent Application Publication No. 2015-122057, for example, there is a problem that a manufacturing process becomes complicated: for example, a step of forming a contact hole for connecting the signal line and one electrode serving as a common electrode and a touch electrode, is separately required.

However, in Japanese Unexamined Patent Application Publication No. 2015-122057, a configuration for connecting signal lines formed in the same layer as a pixel electrode and one electrode serving as a common electrode and a touch electrode, and a manufacturing method thereof are not disclosed.

In addition, in the invention described in Japanese Unexamined Patent Application Publication No. 2009-058913, in order to solve the problem of constituting a storage capacitor having a sufficient size in a display device having a liquid crystal display panel with miniaturized pixel, the display provide no touch sensors.

It is therefore an object of the present invention to provide a configuration capable of suppressing an increase in the number of masks for manufacturing thereof and suppressing an increase in photolithography steps and a manufacturing method thereof in a display device having a touch sensor.

First Embodiment

The following describes a schematic configuration of a display device 100 according to the present embodiment, a circuit configuration of the display device 100, a configuration of a pixel of the display device 100, and a method for manufacturing the display device 100.

[Schematic Configuration]

Figure 1:
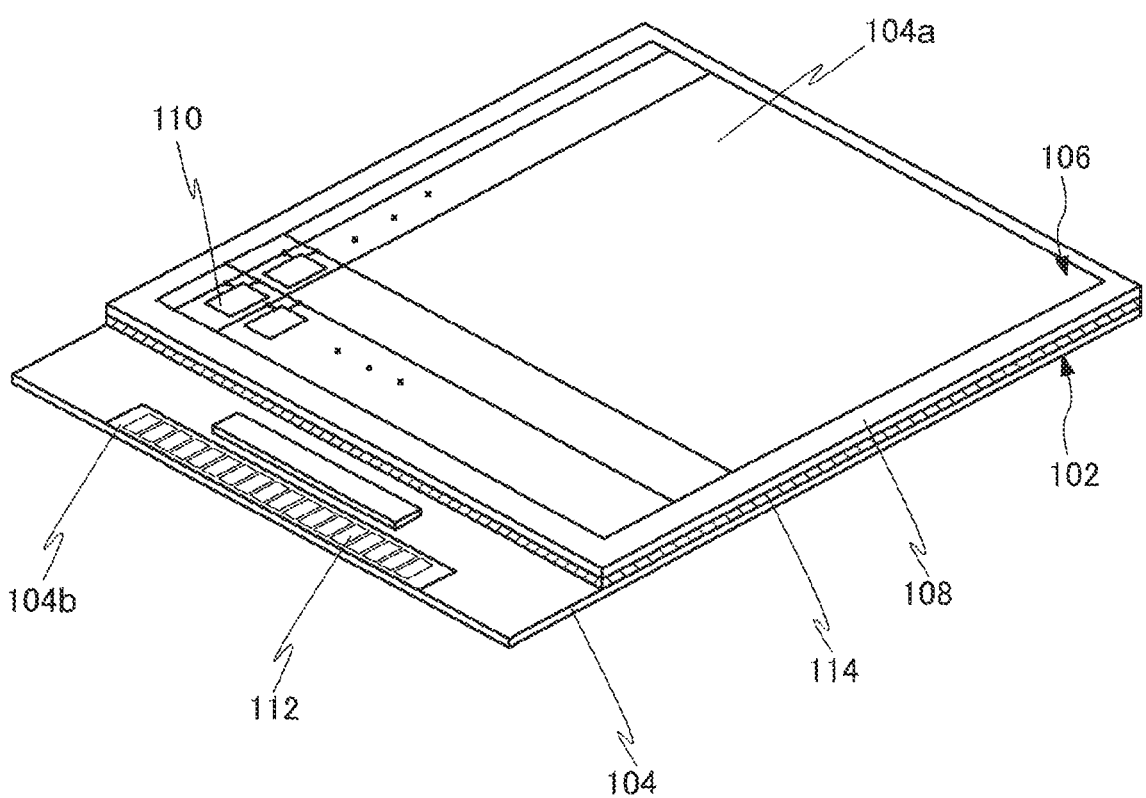
FIG. 1 is a perspective view illustrating a schematic configuration of a display device according to an embodiment of the present invention.

FIG. 1 is a perspective view illustrating a schematic configuration of a display device 100 according to the present embodiment. The display device 100 according to the present embodiment includes an array substrate 102, a counter substrate 106, and a plurality of connection terminals 112.

The array substrate 102 includes at least a first substrate 104 and a plurality of pixels 110. The first substrate 104 has a display area 104a and a terminal area 104b on a surface thereof. The first substrate 104 serves as a support for the plurality of pixels 110. The first substrate 104 can be made of a material such as a glass substrate, an acrylic resin substrate, an alumina substrate, or a polyimide substrate.

The plurality of pixels 110 are arranged on one surface of the first substrate 104. The display area 104a is an area where the plurality of pixels 110, which contribute to an image display, are arranged. In the present embodiment, the plurality of pixels 110 are arranged in rows and columns. The plurality of pixels 110 may be arranged in any number. For example, the plurality of pixels 110 may be arranged in a matrix with m rows and n columns (where m and n are integers). It should be noted that, instead of being arranged in rows and columns, the plurality of pixels 110 may be appropriately arranged in any other arrangement such as a delta arrangement or a PenTile arrangement.

The counter substrate 106 includes a second substrate 108. The second substrate 108 may be similar to the first substrate 104. The second substrate 108 is provided on an upper surface of the display area 104a so as to face the first substrate 104. The second substrate 108 is fixed to the first substrate 104 by a sealant 114 surrounding the display area 104a. The display area 104a disposed on the first substrate 104 is sealed with the second substrate 108 and the sealant 114.

It should be noted that although the display device 100 according to the present embodiment includes the aforementioned second substrate 108, the second substrate 108 is not limited to a plate-like member but may be replaced by a film substrate or a sealing subsrate coated with resin or the like.

The counter substrate 106 may further include a color filter, a light-blocking layer, a polarizing plate, a phase plate, and the like, although these components are not illustrated. The color filter is disposed in places facing each separate pixel 110. The light-blocking layer (also called "black matrix") is disposed in places demarcating each separate pixel 110. The polarizing plate and the phase plate cover the plurality of pixels 110 and are disposed on an outer surface of the counter substrate 106.

The plurality of connection terminals 112 are arranged at one end of the first substrate 104 and outside of the second substrate 108. The terminal area 104b is an area where the plurality of connection terminals 112 are arranged. To the plurality of connection terminals 112, a circuit board (not illustrated) is connected. The circuit board connects the display device 100 to a device that outputs video signals, a power source, and the like. The plurality of connection terminals 112 have outwardly exposed contacts connected to the circuit board.

The foregoing has described a schematic configuration of the display device 100 according to the present embodiment. The following describes a circuit configuration of the display device 100 according to the present embodiment with reference to the drawings.

[Circuit Configuration]

Figure 2:
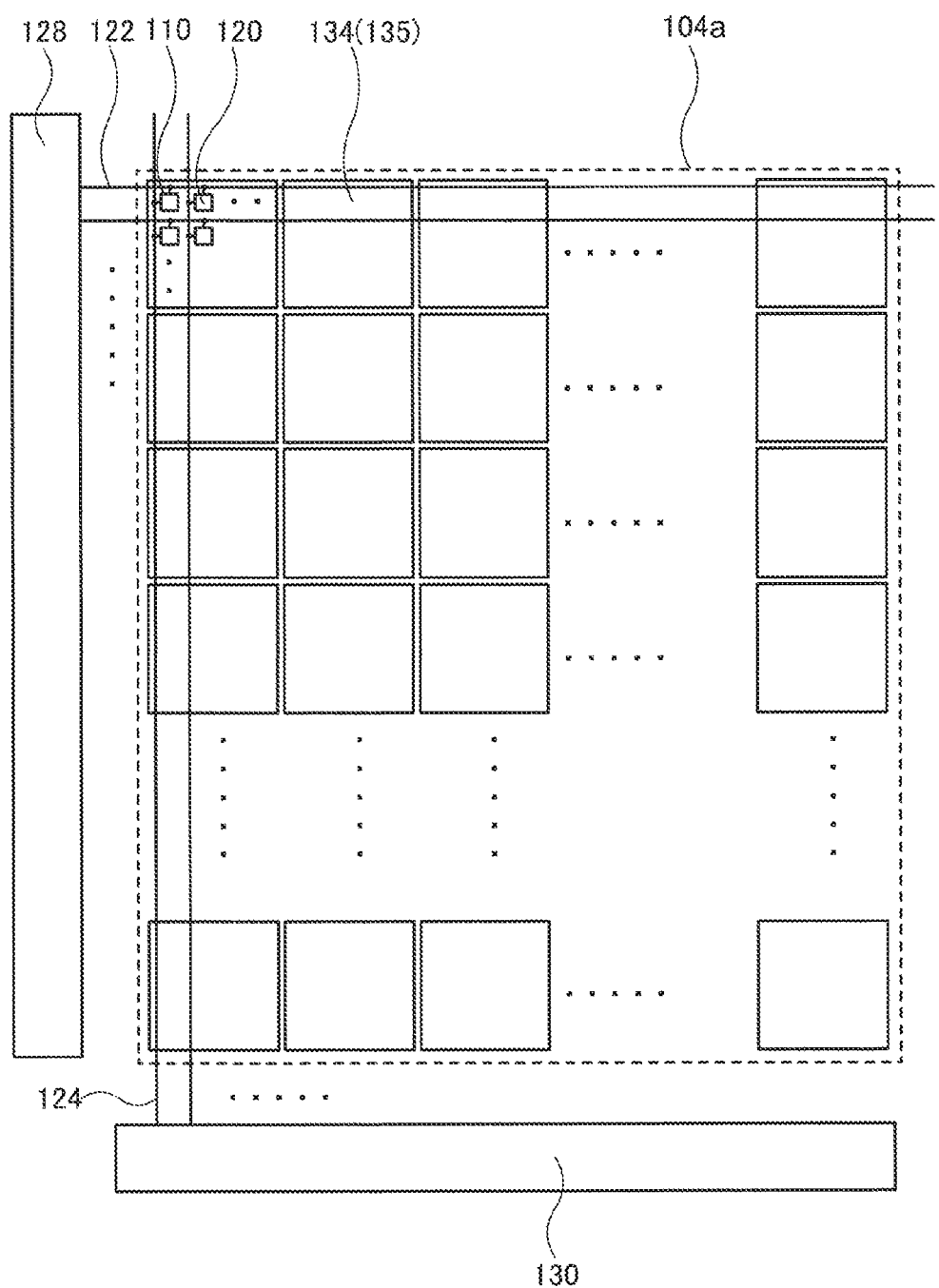
FIG. 2 is a circuit diagram illustrating a circuit configuration of a display device according to an embodiment of the present invention that is involved in a display.
Figure 3:
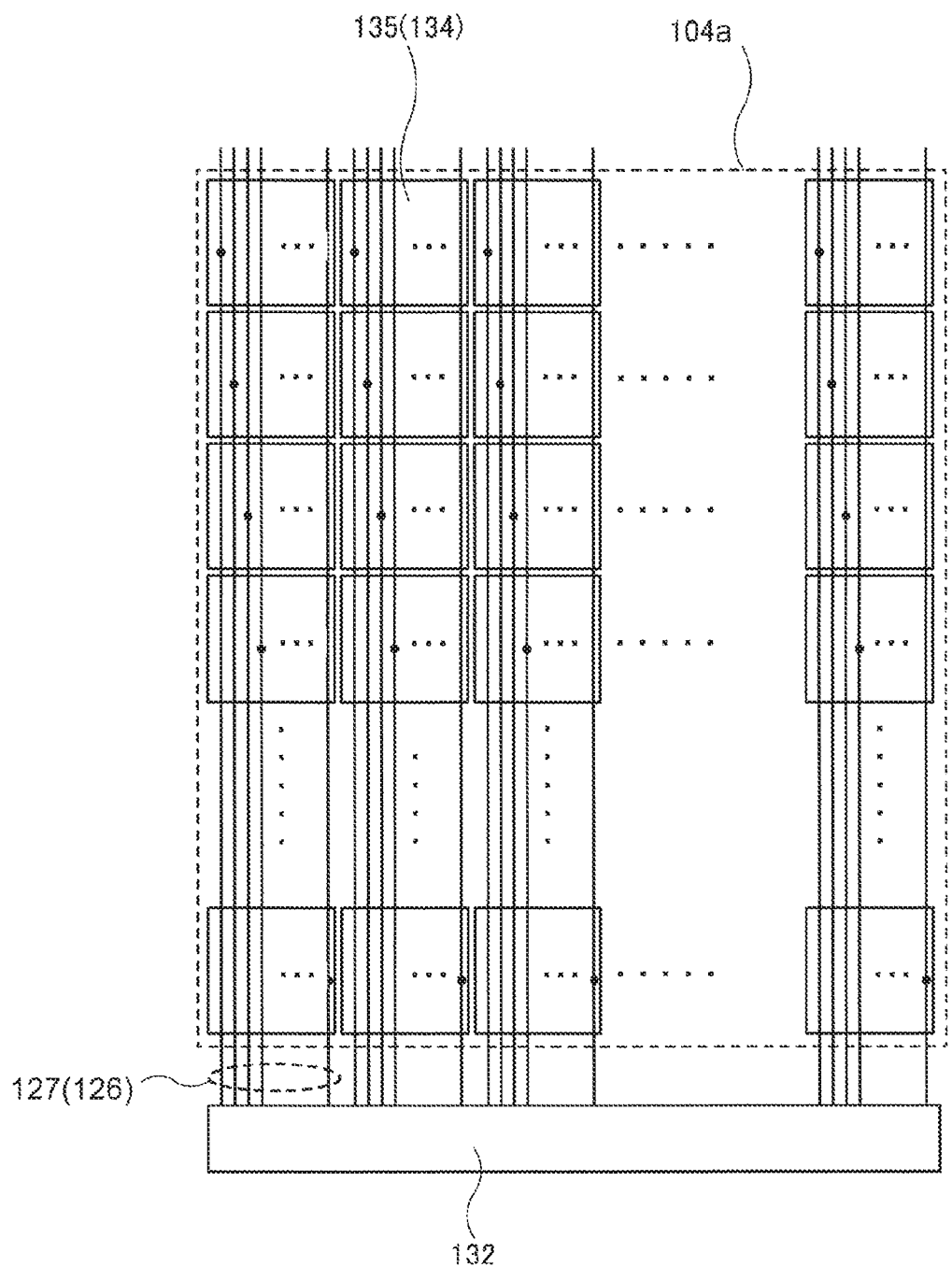
FIG. 3 is a circuit diagram illustrating a circuit configuration of a display device according to an embodiment of the present invention that is involved in touch detection.

FIG. 2 is a circuit diagram illustrating a circuit configuration of the display device 100 according to the present embodiment that is involved in a display. FIG. 3 is a circuit diagram illustrating a circuit configuration of the display device 100 according to the present embodiment that is involved in touch detection.

The display device 100 according to the present embodiment includes a plurality of pixel circuits 120, a plurality of scanning signal lines 122, a plurality of video signal lines 124, a plurality of touch signal lines 127, a scanning line driving circuit 128, a video line driving circuit 130, and a touch scanning detection circuit 132.

Each of the plurality of pixel circuits 120 is provided for the corresponding one of the plurality of pixels 110. The plurality of pixel circuits 120 are arranged in rows and columns.

As illustrated in FIG. 2, each of the plurality of scanning signal lines 122 extends in a horizontal direction and is connected to those of the plurality of pixel circuits 120 arranged in rows and columns which are arranged in the same pixel row.

As illustrated in FIG. 2, each of the plurality of video signal lines 124 extends in a vertical direction and is connected to those of the plurality of pixel circuits 120 arranged in rows and columns which are arranged in the same pixel column.

As illustrated in FIG. 3, each of the plurality of touch signal lines 127 extends in a vertical direction and is connected to any one of a plurality of touch detection electrodes 135. That is, the plurality of touch signal lines 127 are provided in at least the same number as the plurality of touch detection electrodes 135. It should be noted that although the present embodiment shows an aspect in which the plurality of touch signal lines 127 extend in a vertical direction, they may extend in a horizontal direction.

As illustrated in FIG. 2, the scanning line driving circuit 128 is connected to the plurality of scanning signal lines 122. The scanning line driving circuit 128 selects pixel rows in sequence through the plurality of scanning signal lines 122.

As illustrated in FIG. 2, the video line driving circuit 130 is connected to the plurality of video signal lines 124. As the scanning line driving circuit 128 selects pixel rows through the scanning signal lines 122, the video line driving circuit 130 causes a voltage corresponding to a video signal of the pixel row selected to be written through the plurality of video signal lines 124 to pixels electrically connected to the plurality of video signal lines 124.

FIG. 2 illustrates a common electrode 134 disposed for the plurality of pixel circuits 120. The common electrode 134 is divided into common electrodes 134 for each separate pixel group. Thus, each of the plurality of common electrodes 134 thus divided is disposed across one pixel group. One pixel group is constituted by pixels 110 arranged in a matrix with m1 rows and n1 columns (where m1 and n1 are integers of smaller than m and n, respectively). The common electrodes 134 disposed across each separate pixel group function as the touch detection electrodes 135 in a touch drive mode.

As illustrated in FIG. 3, the touch scanning detection circuit 132 is connected to the plurality of touch signal lines 127. Each of the plurality of touch signal lines 127 is connected to any of the plurality of touch detection electrodes 135. Each of the plurality of touch detection electrodes 135 is provided across one pixel group. Each of the plurality of touch detection electrodes 135 needs only have such a size as to have necessary and sufficient resolving power in touch detection. For example, each of the plurality of touch detection electrodes 135 needs only have a size of approximately 4 mm square to 5 mm square. The number of pixels 110 that are arranged to constitute one pixel group needs only be determined in consideration of this size. The plurality of touch detection electrodes 135 function as the aforementioned common electrodes 134 in a display mode. Further, the plurality of touch signal lines 127 function as common potential lines 126 in the display mode.

The touch scanning detection circuit 132 detects the position of a touch by applying touch drive signals to the plurality of touch detection electrodes 135 in sequence during the touch drive mode and acquiring variations in capacitance of the plurality of touch detection electrodes 135.

Figure 4:
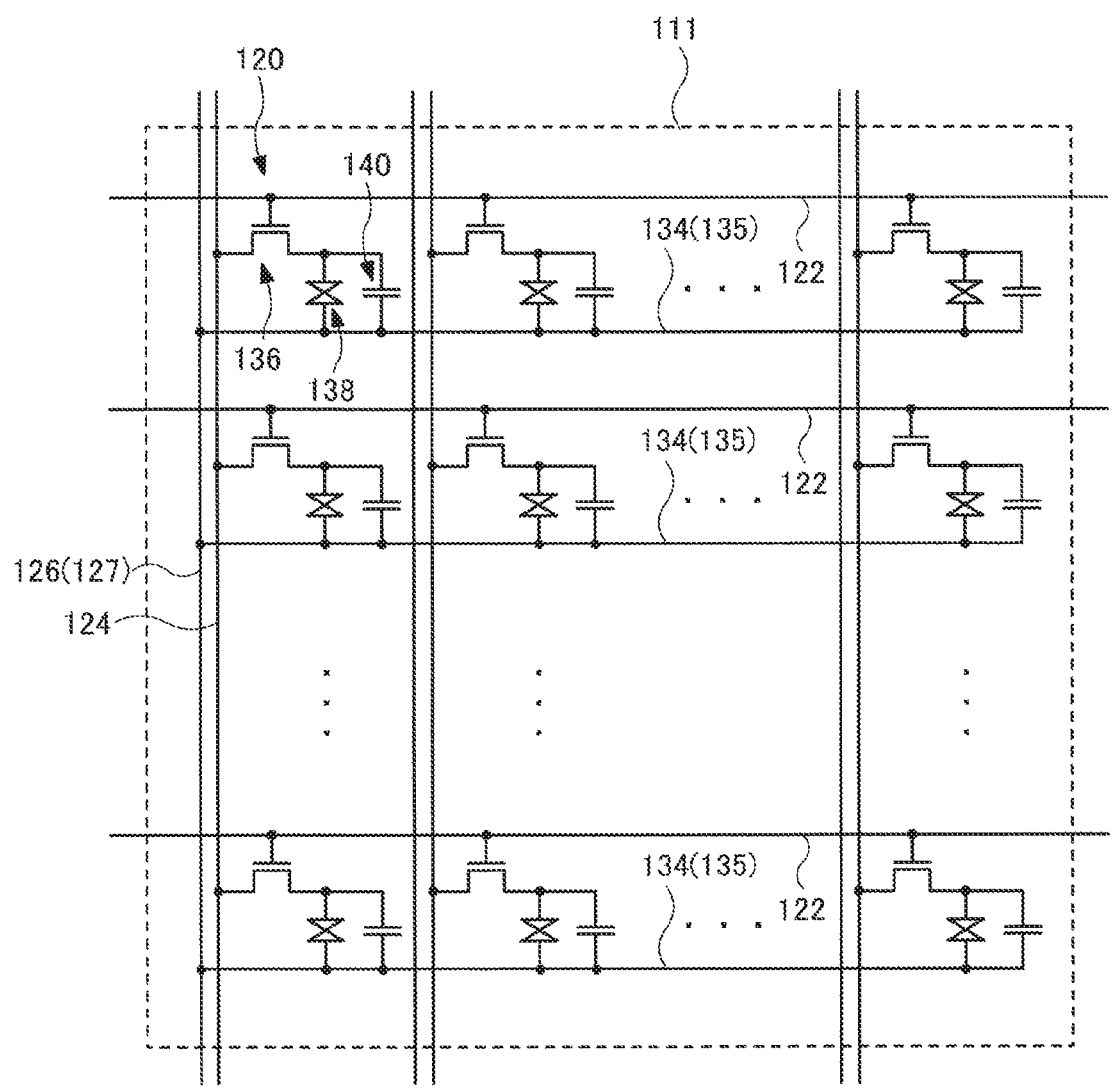
FIG. 4 is a circuit diagram illustrating a circuit configuration of one pixel group of a display device according to an embodiment of the present invention that is involved in a display.
Figure 5:
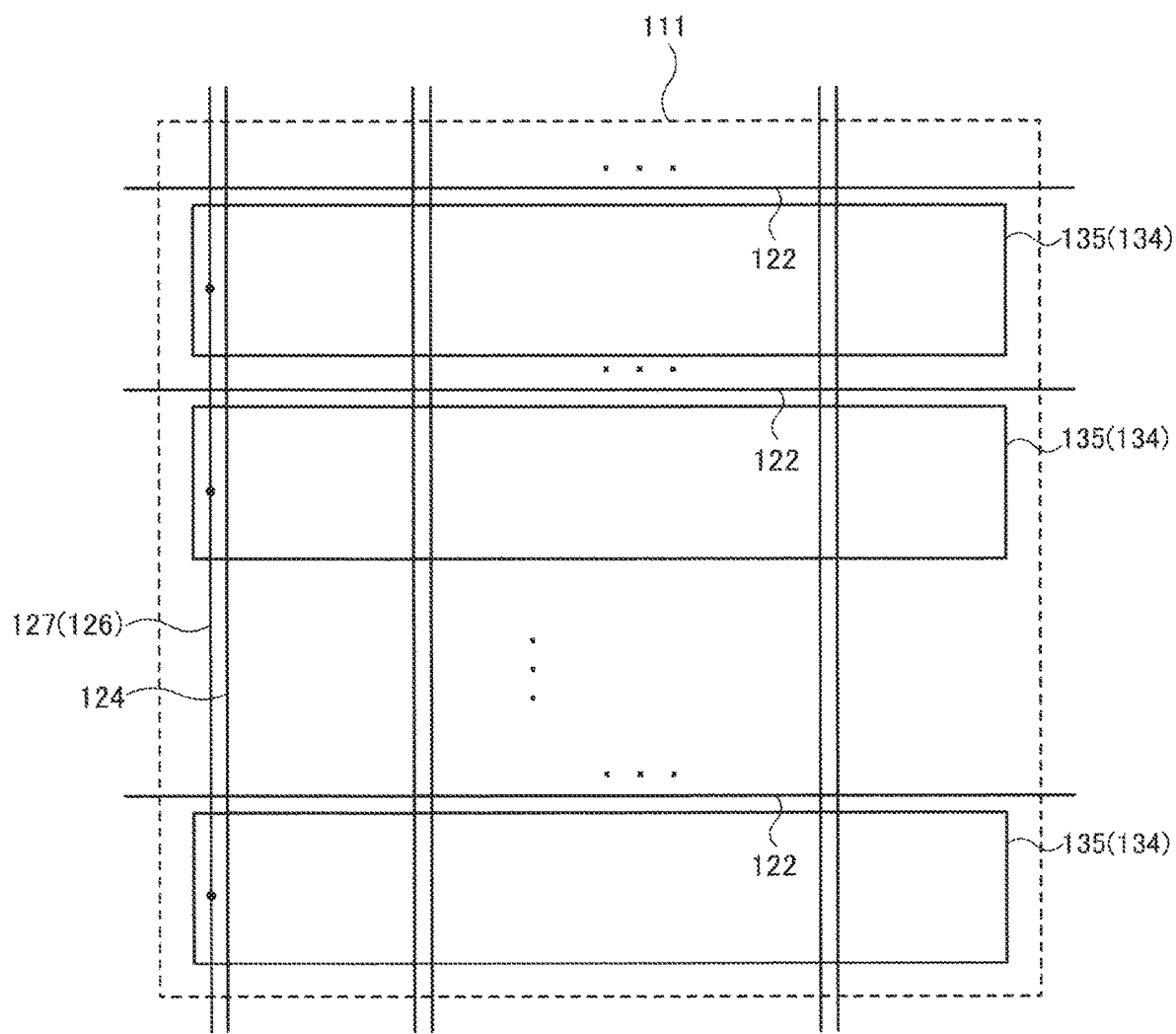
FIG. 5 is a circuit diagram illustrating a circuit configuration of one pixel group of a display device according to an embodiment of the present invention that is involved in touch detection.

FIG. 4 is a circuit diagram illustrating a circuit configuration of one pixel group 111 in the circuit diagram of FIG. 2 which illustrates the circuit configuration involved in a display. FIG. 5 is a circuit diagram illustrating a circuit configuration of one pixel group 111 in the circuit diagram of FIG. 3 which illustrates the circuit configuration involved in touch detection.

Each of the plurality of pixel groups 111 is constituted by a plurality of pixel circuits 120. As mentioned above, in the present embodiment, each of the plurality of pixel groups 111 is constituted by a plurality of pixel circuits 120 arranged in a matrix with m1 rows and n1 columns. As illustrated in FIG. 4, each of the plurality of pixel circuits 120 includes a switching element 136, a liquid crystal capacitor 138, and a retention capacitor 140.

In the present embodiment, the switching element 136 is a thin-film transistor. The thin-film transistor has its gate connected to a scanning signal line 122. The thin-film transistor has its source connected to a video signal line 124. The thin-film transistor has its drain connected a first end of the liquid crystal capacitor 138 and a first end of the retention capacitor 140.

The liquid crystal capacitor 138 has its first end connected to the drain of the thin-film transistor. The liquid crystal capacitor 138 has its second end connected to a common potential line 126. Furthermore, specifically, the liquid crystal capacitor 138 has its second end connected to the common potential line 126 via a common electrode 134. The common potential line 126 serves as a touch signal line 127 in the touch drive mode. In one pixel group 111, the liquid crystal capacitors 138 of pixel circuits 120 arranged in the same pixel row have their second ends connected to the same common electrode 134.

The retention capacitor 140 has its first end connected to the drain of the thin-film transistor. The retention capacitor 140 has its second end connected to a common potential line 126. Furthermore, specifically, the retention capacitor 140 has its second end connected to the common potential line 126 via a common electrode 134. In one pixel group 111, the retention capacitors 140 of pixel circuits 120 arranged in the same pixel row have their second ends connected to the same common electrode 134.

As illustrated in FIG. 5, in one pixel group 111, the touch detection electrode 135 is disposed in the form of a plurality of strips. Each of the plurality of strip touch detection electrodes 135 is provided for pixels 110 arranged in a pixel row in one pixel group 111. The plurality of strip touch detection electrodes 135 in one pixel group 111 are connected to any one of the plurality of touch signal lines 127.

The foregoing has described a circuit configuration of the display device 100 according to the present embodiment. The following describes in detail a configuration of a pixel 110 of the display device 100 according to the present embodiment with reference to the drawings.

[Configuration of Pixel]

Figure 6:
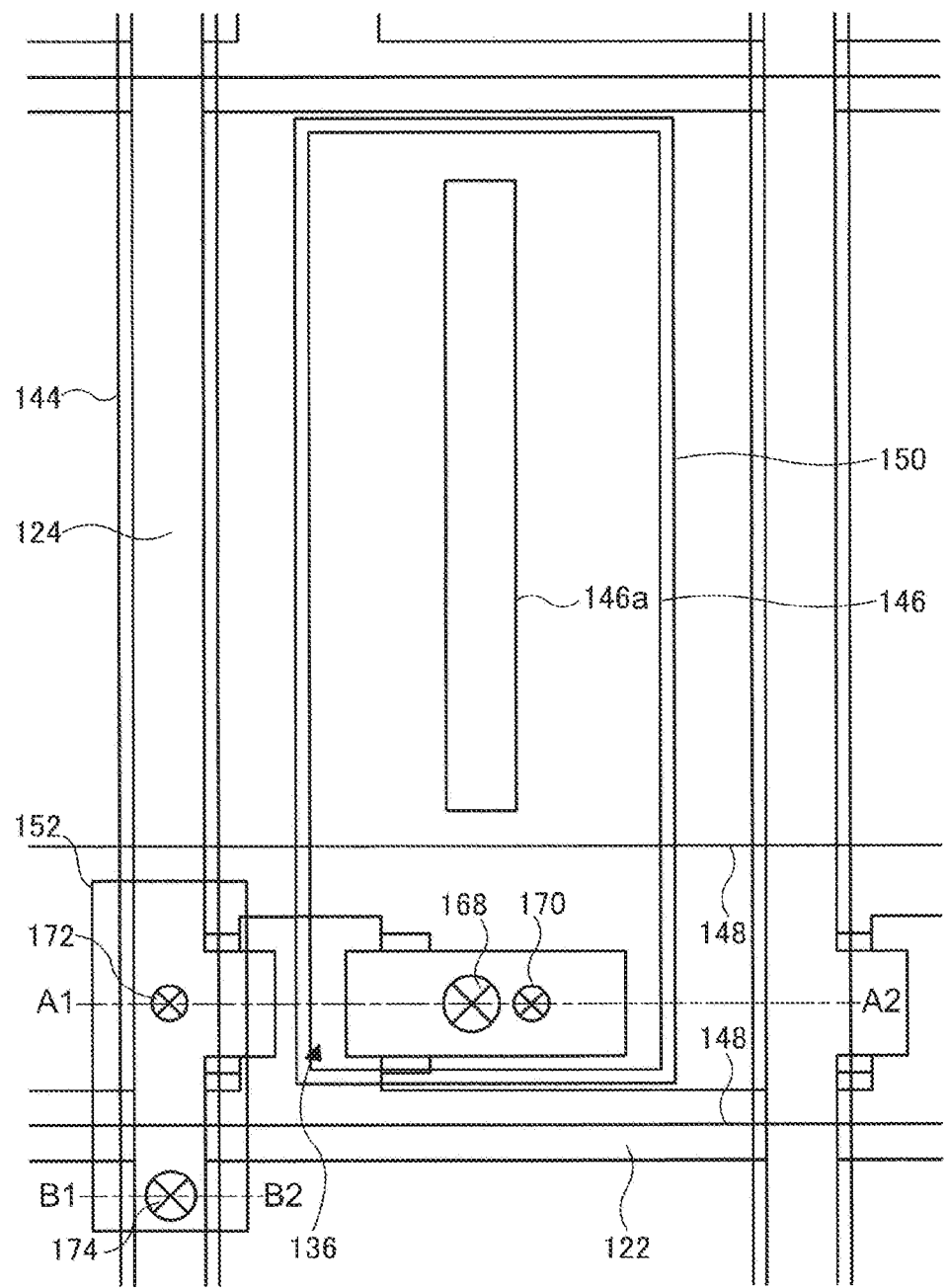
FIG. 6 is a plan view illustrating a configuration of a pixel of a display device according to an embodiment of the present invention.
Figure 7:
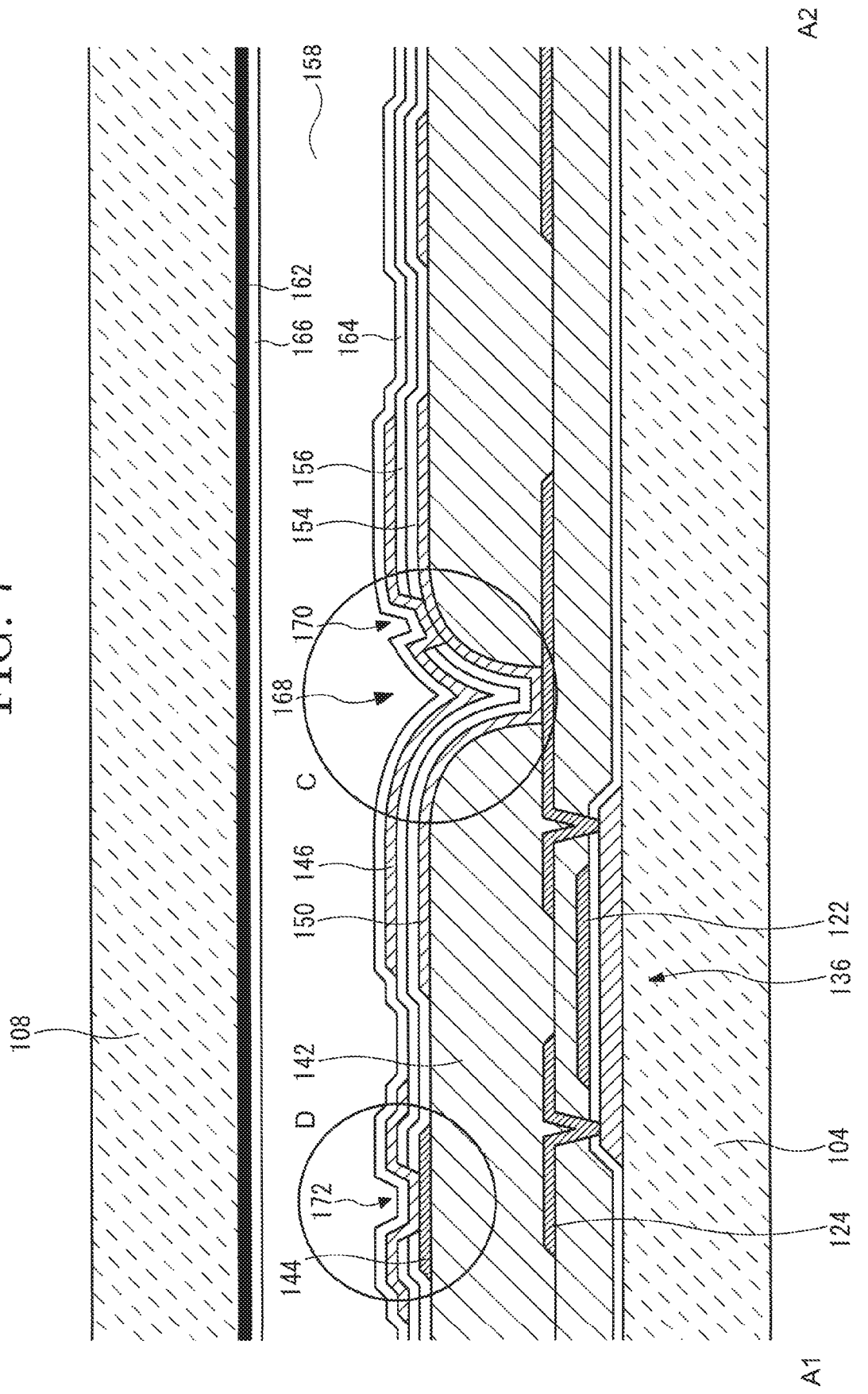
FIG. 7 is a cross-sectional view illustrating a configuration of a pixel of a display device according to an embodiment of the present invention.
Figure 8:
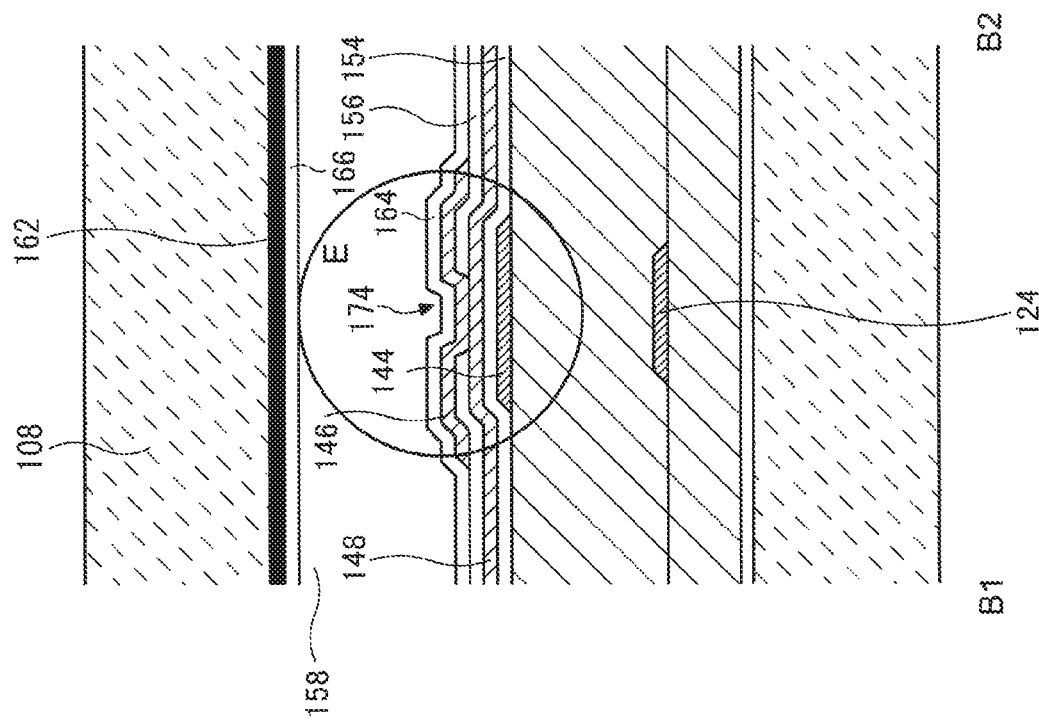
FIG. 8 is a cross-sectional view illustrating a configuration of a pixel of a display device according to an embodiment of the present invention.
Figure 9:
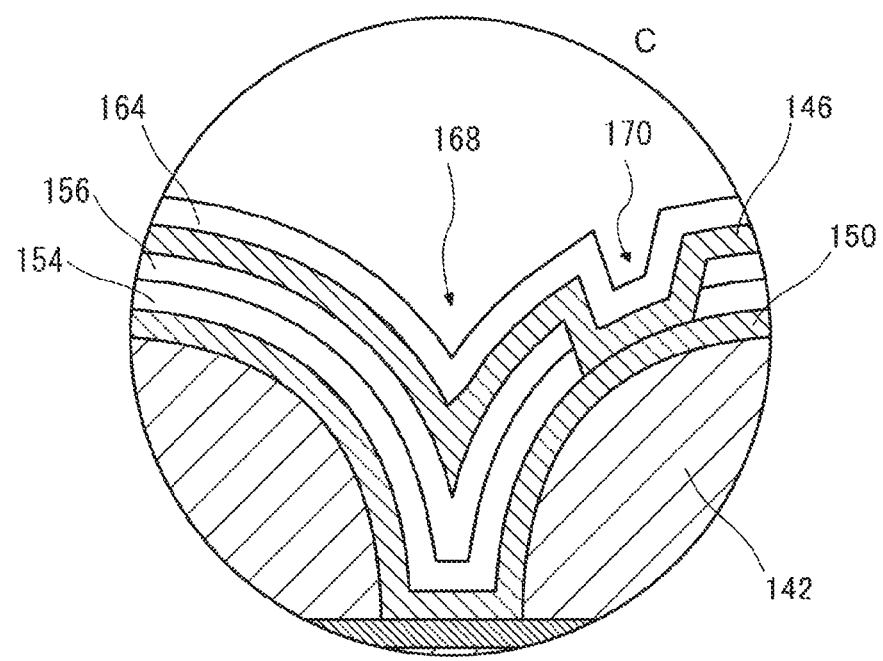
FIG. 9 is an enlarged cross-sectional view illustrating a configuration of a pixel of display device according to an embodiment of the present invention.
Figure 10:
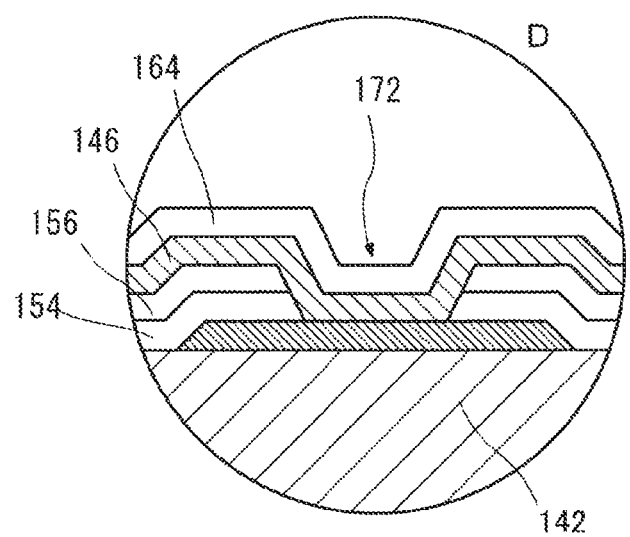
FIG. 10 is an enlarged cross-sectional view illustrating a configuration of a pixel of a display device according to an embodiment of the present invention.
Figure 11:
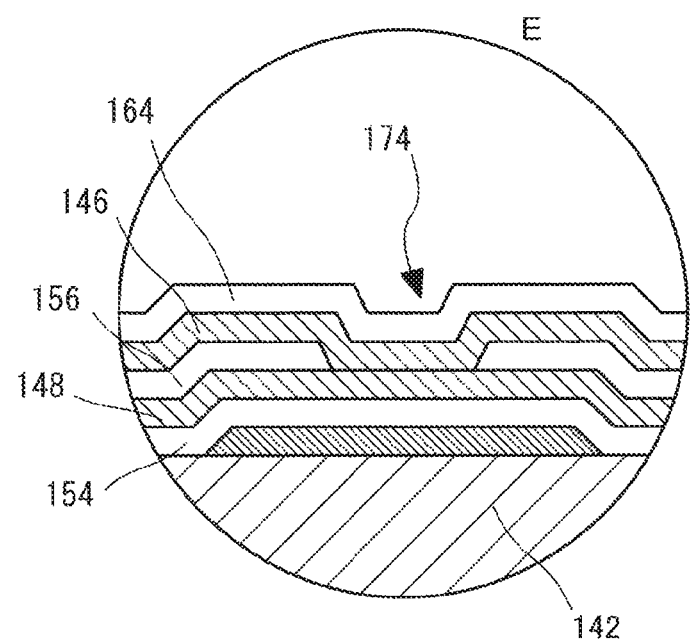
FIG. 11 is an enlarged cross-sectional view illustrating a configuration of a pixel of a display device according to an embodiment of the present invention.

FIG. 6 is a plan view illustrating a configuration of a pixel 110 of the display device 100 according to the present embodiment. FIG. 7 is a cross-sectional view illustrating the configuration of the pixel 110 of the display device 100 according to the present embodiment as taken along line A1-A2 of FIG. 6. FIG. 8 is a cross-sectional view illustrating the configuration of the pixel 110 of the display device 100 according to the present embodiment as taken along line B1-B2 of FIG. 6. FIG. 9 is a partially-enlarged cross-sectional view of part C in the cross-sectional view of FIG. 7 which illustrates the configuration of the pixel 110. FIG. 10 is a partially-enlarged cross-sectional view of part D in the cross-sectional view of FIG. 7 which illustrates the configuration of the pixel 110. FIG. 11 is a partially-enlarged cross-sectional view of part E in the cross-sectional view of FIG. 8 which illustrates the configuration of the pixel 110.

The display device 100 according to the present embodiment includes the first substrate 104, the second substrate 108, the plurality of switching elements 136, the plurality of scanning signal lines 122, the plurality of video signal lines 124, a first organic insulating layer 142, a first metal layer 144, a first conductive layer 150, a first inorganic insulating layer 154, a second conductive layer 148, a second inorganic insulating layer 156, a third conductive layer 146, a fourth conductive layer 152, and a liquid crystal layer 158.

The first substrate 104 serves as a support for the plurality of pixels 110. The first substrate 104 can be made of a material such as a glass substrate, an acrylic resin substrate, an alumina substrate, or a polyimide substrate.

Each of the plurality of switching elements 136 is provided in the corresponding one of the plurality of pixels 110. In the present embodiment, the switching elements 136 are thin-film transistors.

The plurality of scanning signal lines 122 are provided for each separate horizontal arrangement (pixel row) of the plurality of pixels 110. As illustrated in FIG. 6, each of the plurality of scanning signal lines 122 is connected to the gate of a switching element 136 in one pixel 110. In the present embodiment, each of the plurality of scanning signal lines 122 has a projecting part in one pixel 110, and the projecting part functions as the gate of the switching element 136.

The plurality of video signal lines 124 are provided for each separate vertical arrangement (pixel column) of the plurality of pixels 110. As illustrated in FIG. 6, each of the plurality of video signal lines 124 is connected to the source of a switching element 136 in one pixel 110. In the present embodiment, each of the plurality of video signal lines 124 has a projecting part in one pixel 110, and the projecting part functions as the source of the switching element 136. The plurality of video signal lines 124 supply video signals to the plurality of pixels 110.

The first organic insulating layer 142 covers the plurality of switching elements 136, the plurality of scanning signal lines 122, and the plurality of video signal lines 124. The first organic insulating layer 142 is provided with first contact holes 168. Each of the first contact holes 168 is a contact hole via which the drain of the switching element 136 provided in the corresponding one of the plurality of pixels 110 and the first conductive layer 150 are connected to each other.

The first organic insulating layer 142 can be made of a material such as polyimide resin, acrylic resin, or a combination thereof.

The first metal layer 144 is a layer that functions as the common potential lines 126 in the display mode and functions as the touch signal lines 127 in the touch drive mode. The first metal layer 144 is provided above the first organic insulating layer 142. Furthermore, in a plan view, the first metal layer 144 is provided along any of the plurality of video signal lines 124. The first metal layer 144 needs only be connected to the second conductive layer 148 provided in each of the plurality of pixel groups 111. Therefore, the required number of lines of the first metal layer 144 is not necessarily equal to the number of video signal lines 124. Therefore, the first metal layer 144 does not need to be provided above one or some of the plurality of video signal lines 124. It should be noted that, from the point of view of vie ability of the display device 100, each of the plurality of video signal lines 124 may be provided with a first metal layer 144 serving as a dummy.

The first metal layer 144 can be made of a material such as a light-blocking metal having a laminated structure in which a W layer, a MoW layer, and an Al layer are sandwiched between upper and lower Mo layers, a laminated structure in which an Al layer is sandwiched between upper and lower Ti layers, or the like.

The first conductive layer 150 is a layer that functions as first electrodes of the retention capacitors 140 in the display mode. The first conductive layer 150 is provided above the first organic insulating layer 142 in each of the plurality of pixels 110. Furthermore, the first conductive layer 150 is connected to the source or drain of the switching element 136 of the pixel 110 via the first contact hole 168. FIG. 7 illustrates an example in which the first conductive layer 150 is connected to the drain of the switching element 136.

The first conductive layer 150 can be made of a transparent conductive material such as ITO (indium tin oxide) or IZO (indium zinc oxide) or of any combination thereof. Alternatively, the first conductive layer 150 may be made of a light-blocking metal material other than ITO (indium tin oxide) and IZO (indium zinc oxide). In this case, it is desirable that the light-blocking metal material be the same as that of which the first metal layer 144 is made and be processed through the same steps as that of which the first metal layer 144 is made. Further, in the present embodiment, the first conductive layer 150 is larger in pattern shape than the third conductive layer 146 described below.

The first inorganic insulating layer 154 is a layer that functions as dielectric layers of the retention capacitors 140. The first inorganic insulating layer 154 covers the first conductive layer 150 and the first metal layer 144. The first inorganic insulating layer 154 can be made of a material such as silicon oxide, silicon nitride, or a combination thereof.

The second conductive layer 148 is a layer that functions as the touch detection electrodes 135 in a touch detection mode. Further, the second conductive layer 148 is a layer that functions as the common electrodes 134 and second electrodes of the retention capacitors 140 in the display mode. The second conductive layer 148 is provided above the first inorganic insulating layer 154 in each of the plurality of pixel groups 111. The second conductive layer 148 has a slit extending along a space between adjacent pixel groups 111. Furthermore, in the present embodiment, the second conductive layer 148 is disposed in the form of a plurality of islands in each separate pixel group 111. Specifically, the second conductive layer 148 is disposed in the form of strips in each separate pixel row in each of the plurality of pixel groups 111. Therefore, each pixel 110 includes an area covered with the second conductive layer 148 and an area not covered with the second conductive layer 148. The second conductive layer 148 can be made of the same material as the aforementioned first conductive layer 150. Alternatively, such a combination is possible, for example, that the first conductive layer 150 is made of a transparent electrode material and the second conductive layer 148 is made of a light-blocking material.

The second inorganic insulating layer 156 is provided above the second conductive layer 148 across the plurality of pixels 110. Note here that, as mentioned above, the second conductive layer 148 is disposed in the form of strips in each separate pixel row in each of the plurality of pixel groups 111. Therefore, each of the plurality of pixels 110 includes an area where the second conducive layer 148 is sandwiched between the first inorganic insulating layer 154 and the second inorganic insulating layer 156 and an area where the second conducive layer 148 is not sandwiched between the first inorganic insulating layer 154 and the second inorganic insulating layer 156.

The area where the second conducive layer 148 is not sandwiched between the first inorganic insulating layer 154 and the second inorganic insulating layer 156, i.e. the area of the slit provided in the second conductive layer 148, is provided with a second contact hole 170 and a third contact hole 172. The second contact hole 170 and the third contact hole 172 are both bored through the second inorganic insulating layer 156 and the first inorganic insulating layer 154. The second contact hole 170 reaches the first conductive layer 150. The third contact hole 172 reaches the first metal layer 144. The second contact hole 170 and the third contact hole 172 are substantially equal in diameter to each other. The phrase "substantially equal" specifically means that the difference in diameter between the second contact hole 170 and the third contact hole 172 ranges from −5% to 5%.

Note here that, in the present embodiment, the first contact hole 168 is different in position from the second contact hole 170 in each of the plurality of pixels 110. That is, there is no overlapping area between an area where the first contact hole 168 is bored at the drain of the switching element 136 and an area where the second contact hole 170 is bored at the first conductive layer 150.

It should be noted that the first contact hole 168 and the second contact hole 170 may be disposed in overlapping positions. For example, in a plan view, the area where the first contact hole 168 is bored at the drain of the switching element 136 may be formed to include the area where the second contact hole 170 is bored at the first conductive layer 150.

The area where the second conductive layer 148 is sandwiched between the first inorganic insulating layer 154 and the second inorganic insulating layer 156 is provided with a fourth contact hole 174. The fourth contact hole 174 is bored through the second inorganic insulating layer 156 and reaches the second conductive layer 148.

Note here that, as illustrated in FIG. 6, the fourth contact hole 174 may be larger in diameter than the third contact hole 172 and the second contact hole 170.

The second inorganic insulating layer 156 can be made, for example, of the same material as the aforementioned first inorganic insulating layer 154.

The third conductive layer 146 is a layer that functions as the pixel electrodes 120 in the display mode. The third conductive layer 146 is provided above the second inorganic insulating layer 156 in each of the plurality of pixels 110. Furthermore, the third conductive layer 146 is connected to the first conductive layer 150 via the second contact hole 170. The third conductive layer 146 has a slit 146a in each of the plurality of pixels 110. It should be noted that, in the present embodiment, the third conductive layer 146 is smaller than the first conductive layer 150. Further, while the first conductive layer 150 has no slit formed therein, the third conductive layer 150 has a slit 146a formed therein. Although FIG. 6 illustrates only one slit 146a, there may be two or more slits.

The third conductive layer 146 can be made of the same material as the aforementioned second conductive layer 148 or first conductive layer 150. Alternatively, the structure of the second conductive layer 148 and the third conductive layer 146 may be such a combined structure that the second conductive layer 148 is made of a light-blocking metal material and the third conductive layer 146 serves as a transparent electrode.

The fourth conductive layer 152 is provided above the second inorganic insulating layer 156 in each of the plurality of pixel groups 111. More specifically, a plurality of the fourth conductive layers 152 are provided in the plurality of pixel groups 111. Furthermore, the fourth conductive layer 152 is connected to any of a plurality of the first metal layers 144 via a third contact hole 172 and connected to the second conductive layer 148 via the fourth contact hole 174. That is, the second conductive layer 148 is connected to the first metal layer 144 via the fourth conductive layer 152.

As mentioned above, the second conductive layer 148 is a layer that functions as the touch detection electrodes 135 in the touch drive mode. Meanwhile, the first metal layer 144 is a layer that functions as the touch signal lines 127 in the touch drive mode. Therefore, by having such a configuration as that described above, the touch detection electrodes 135 can be connected to the touch signal lines 127 via the fourth conductive layer 152.

As will be mentioned in detail later, the fourth conductive layer 152 can be formed by the same photolithography step as the third conductive layer 146 in the manufacturing process. Therefore, the fourth conductive layer 152 can be made of the same material as the aforementioned third conductive layer 146.

Disposed above the third conductive layer 146 and the fourth conductive layer 152 is an alignment film 164. The alignment film 164 is provided to cause liquid crystal molecules of the liquid crystal layer 158 to align themselves in a predetermined direction.

The second substrate 108 is provided on the upper surface of the display area 104a so as to face the first substrate 104. Disposed on the surface of the second substrate 108 that faces the first substrate 104 are a color filter 160, a light-blocking layer 162, and an alignment film 166. The color filter 160 is provided in places facing each separate pixel 110. The light-blocking layer 162 (also called "black matrix") is disposed in places demarcating each separate pixel 110. The alignment film 166 is provided to cause the liquid crystal molecules of the liquid crystal layer 158 to align themselves in a predetermined direction. The second substrate 108 may be similar to the first substrate 104. The liquid crystal layer 158 is sandwiched between the first substrate 104 and the second substrate 108.

The foregoing has described a configuration of a pixel 110 of the display device 100 according to the present embodiment. The following describes a method for manufacturing a display device 100 according to the present embodiment with reference to the drawings.

[Manufacturing Method]

FIGS. 12A to 20B are cross-sectional views illustrating a method for manufacturing a display device 100 according to the present embodiment. These drawings correspond a cross-section taken along line A1-A2 or B1-B2 of FIG. 6. The method for manufacturing a display device 100 according to the present embodiment includes the following steps. The following describes a method for manufacturing an array substrate side of a display device 100.

Figure 12A:
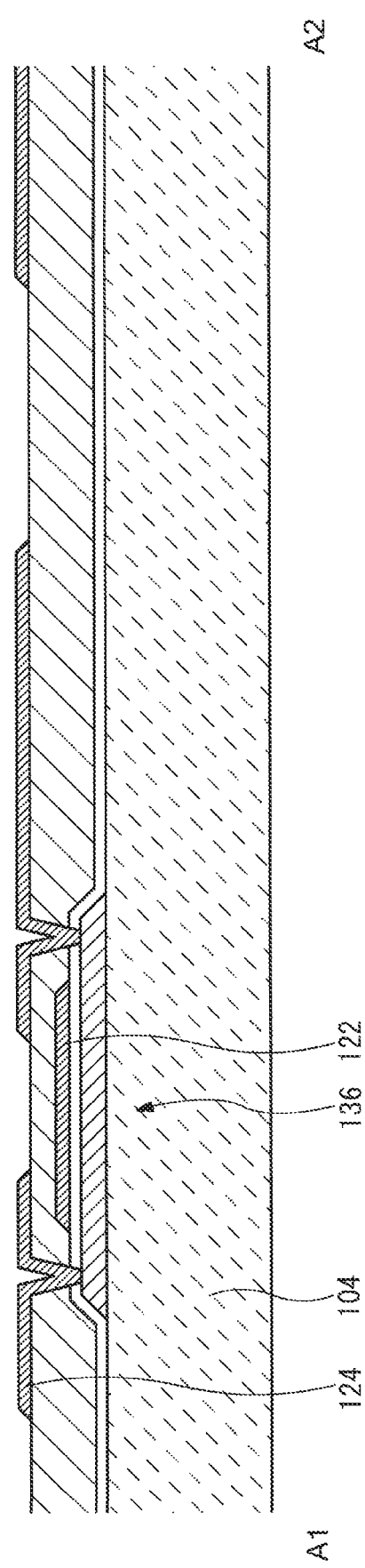
FIG. 12A is a cross-sectional view illustrating a method for manufacturing a pixel of a display device according to an embodiment of the present invention.
Figure 12B:
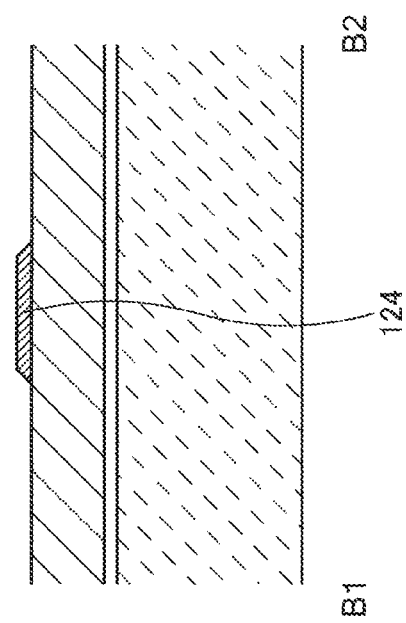
FIG. 12B is a cross-sectional view illustrating a method for manufacturing a pixel of a display device according to an embodiment of the present invention.

First, a plurality of switching elements 136, a plurality of scanning signal lines 122, and a plurality of video signal lines 124 are formed over a first substrate 104 (FIGS. 12A and 12B). Each of the switching elements 136 is provided in the corresponding one of a plurality of pixels 110. In the present embodiment, the plurality of switching elements 136 are thin-film transistors. The plurality of scanning signal lines 122 are wires for selecting, in sequence, a plurality of pixel rows to which video signals are supplied. The plurality of video signal lines 124 are wires for supplying video signals to the plurality of pixels 110.

A first organic insulating layer 142 that covers the plurality of video signal lines 124 is formed. The first organic insulating layer 142 can be made of a material such as polyimide resin, acrylic resin, or a combination thereof. The first organic insulating layer 142 can be formed by a method such as a coating method.

Figure 13B:
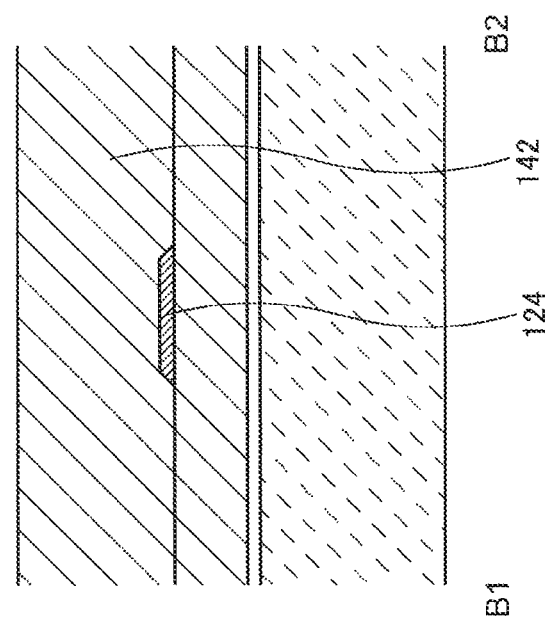
FIG. 13B is a cross-sectional view illustrating a method for manufacturing a pixel of a display device according to an embodiment of the present invention.

Next, in each of the plurality of pixels 110, a first contact hole 168 that reaches the source or drain of a switching element 136 of the pixel 110 is formed (FIGS. 13A and 13B). In the present embodiment, a first contact hole 168 is formed in the first organic insulating layer 142 by a photolithography step so as to reach the drain of a switching element 136 provided in each of the plurality of pixels 110.

Figure 14A:
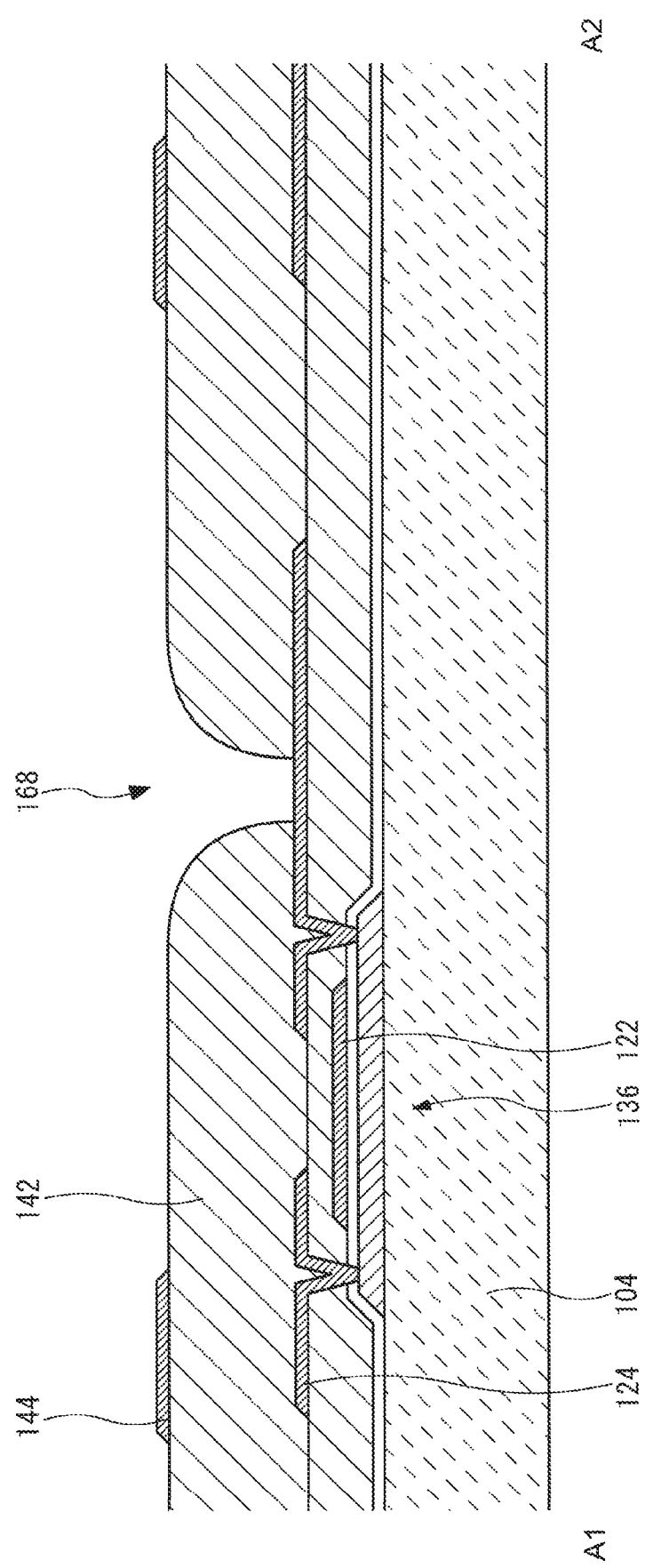
FIG. 14A is a cross-sectional view illustrating a method for manufacturing a pixel of a display device according to an embodiment of the present invention.
Figure 14B:
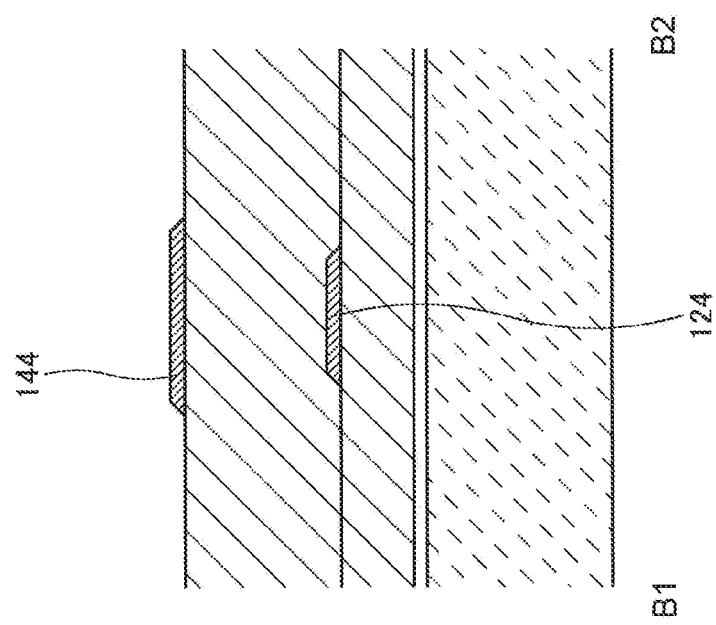
FIG. 14B is a cross-sectional view illustrating a method for manufacturing a pixel of a display device according to an embodiment of the present invention.

Next, a first metal layer 144 that extends along any of the plurality of video signal lines 124 is formed above the first organic insulating layer 142 (FIGS. 14A and 14B).

The first metal layer 144 can be made of a material having a laminated structure in which a W layer, a MoW layer, and an Al layer are sandwiched between upper and lower Mo layers, a laminated structure in which an Al layer is sandwiched between upper and lower Ti layers, or the like. The first metal layer 144 can be formed by a method such as a sputtering method. In one example, the three types of wires, namely the scanning signal lines 122, the video signal lines 124, and the first metal layer 144 are made of different metal materials, namely MoW, a material having a laminated structure in which an Al layer is sandwiched between upper and lower Ti layers, and a material having a laminated structure in which an Al layer is sandwiched between upper and lower Mo layers, respectively.

Figure 15A:
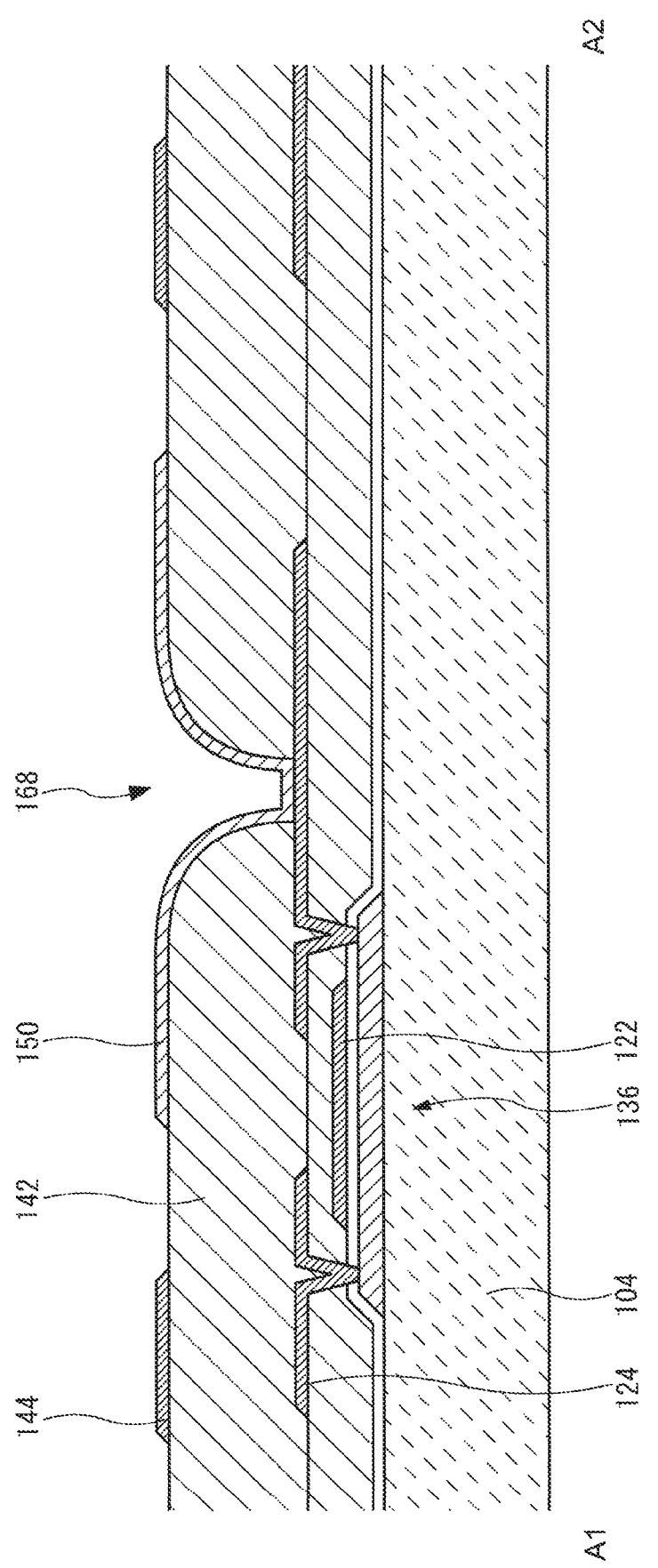
FIG. 15A is a cross-sectional view illustrating a method for manufacturing a pixel of a display device according to an embodiment of the present invention.

Next, a first conductive layer 150 is formed above the first organic insulating layer 142 in each of the plurality of pixels 110 (FIGS. 15A and 15B). Note here that the first conductive layer 150 is formed so as to be separate from the first metal layer 144. This allows the first conductive layer 150 to be connected to the switching elements 136 of the pixels 110 via the first contact holes 168.

The first conductive layer 150 can be made of a material such as ITO (indium tin oxide) or IZO (indium zinc oxide) or of any combination thereof. The first conductive layer 150 can be formed by a method such as a sputtering method. Further, instead of being made of a transparent electrode material, the first conductive layer 150 can be made of the same material as the first metal layer 144. In a case where the first conductive layer 150 can be made of the same material as the first metal layer 144, the first conductive layer 150 and the first metal layer 144 can be collectively manufactured through the same manufacturing process steps.

Figure 16B:
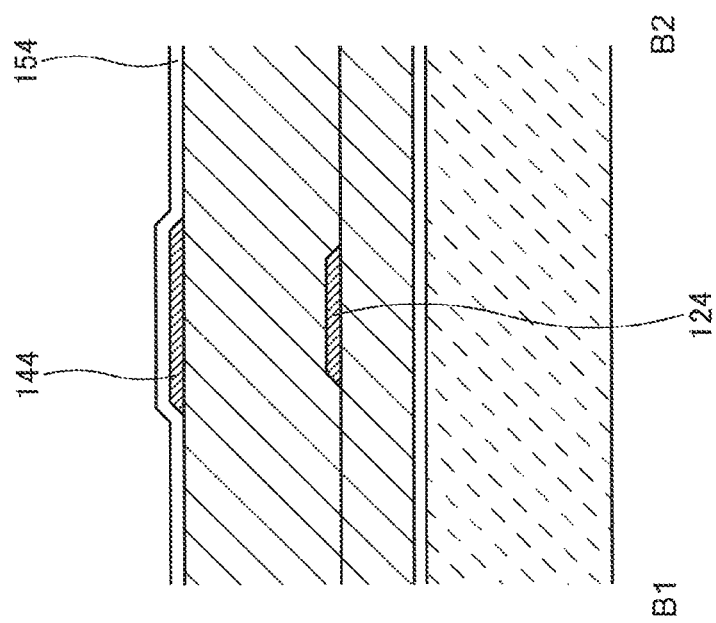
FIG. 16B is a cross-sectional view illustrating a method for manufacturing a pixel of a display device according to an embodiment of the present invention.

Next, a first inorganic insulating layer 154 that covers the first metal layer 144 and the first conductive layer 150 is formed (FIGS. 16A and 16B). The first inorganic insulating layer 154 can be made of a material such as silicon oxide, silicon nitride, or a combination thereof. The first inorganic insulating layer 154 can be formed by a method such as a CVD method or a sputtering method.

Figure 17A:
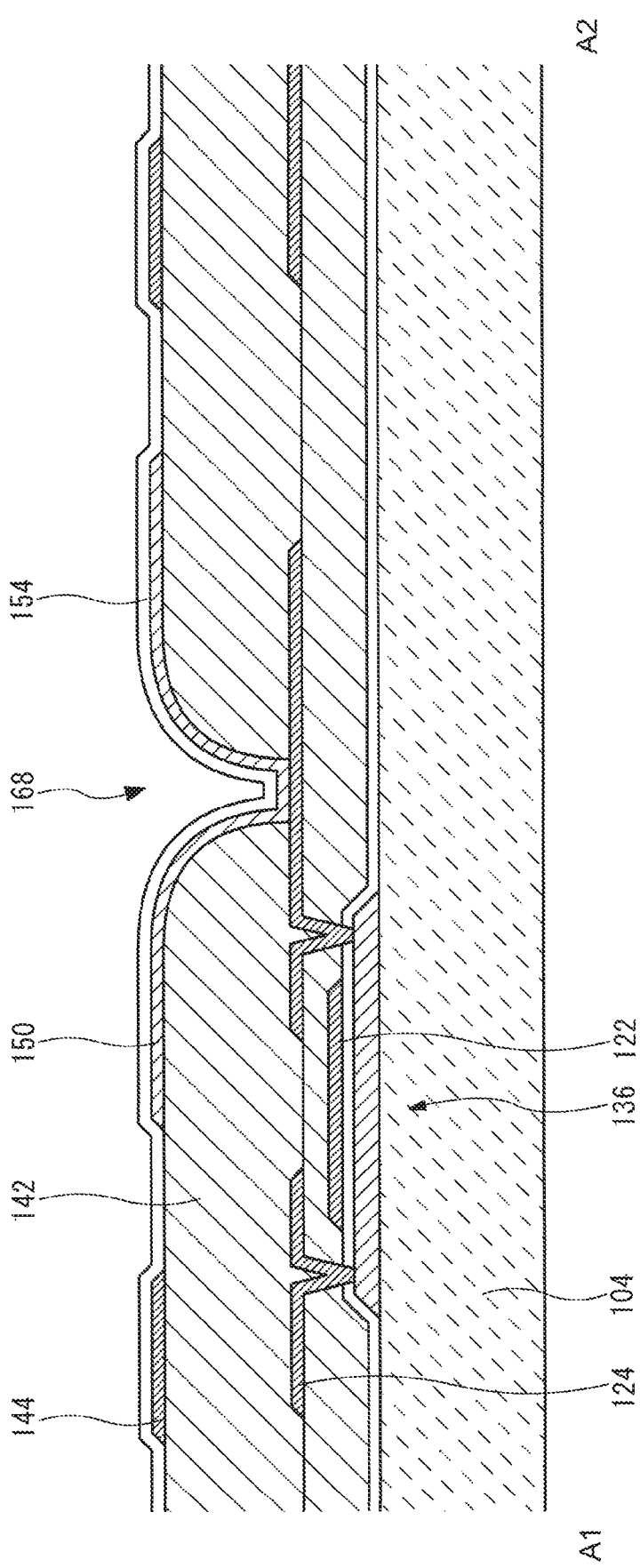
FIG. 17A is a cross-sectional view illustrating a method for manufacturing a pixel of a display device according to an embodiment of the present invention.
Figure 17B:
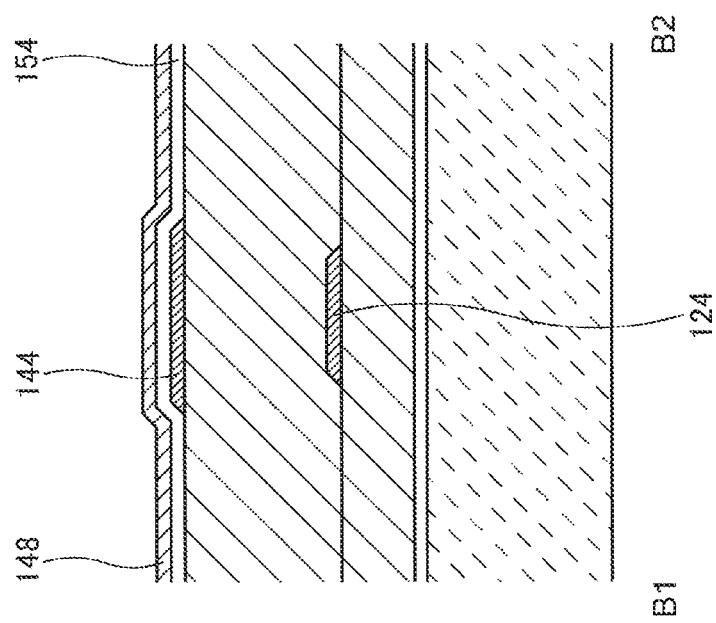
FIG. 17B is a cross-sectional view illustrating a method for manufacturing a pixel of a display device according to an embodiment of the present invention.

Next, a second conductive layer 148 is formed above the first inorganic insulating layer 154 in each of a plurality of pixel groups 111 (FIGS. 17A and 17B). In the present embodiment, as mentioned above, the first conductive layer 150 is disposed in the form of strips in each separate pixel row in each of the plurality of pixel groups 111. Therefore, each pixel 110 includes an area covered with the second conductive layer 148 and an area not covered with the second conductive layer 148.

Figure 18A:
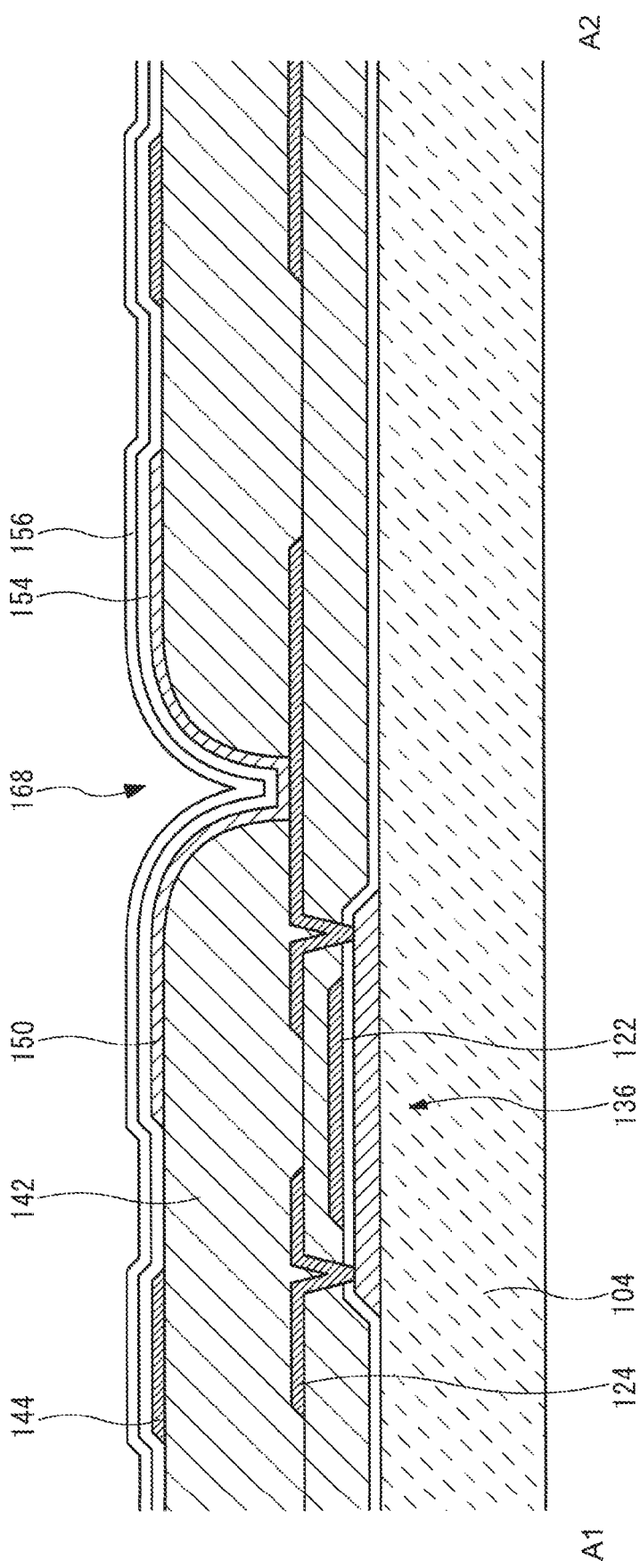
FIG. 18A is a cross-sectional view illustrating a method for manufacturing a pixel of a display device according to an embodiment of the present invention.
Figure 18B:
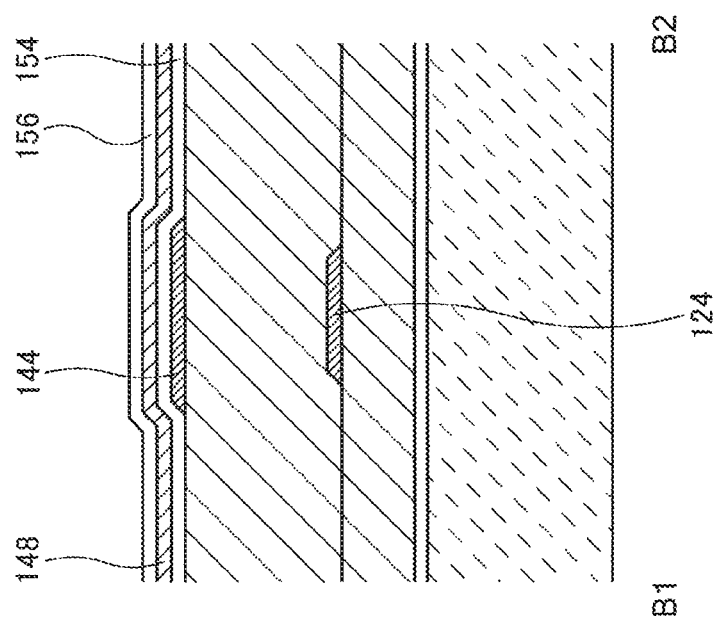
FIG. 18B is a cross-sectional view illustrating a method for manufacturing a pixel of a display device according to an embodiment of the present invention.
Figure 19A:
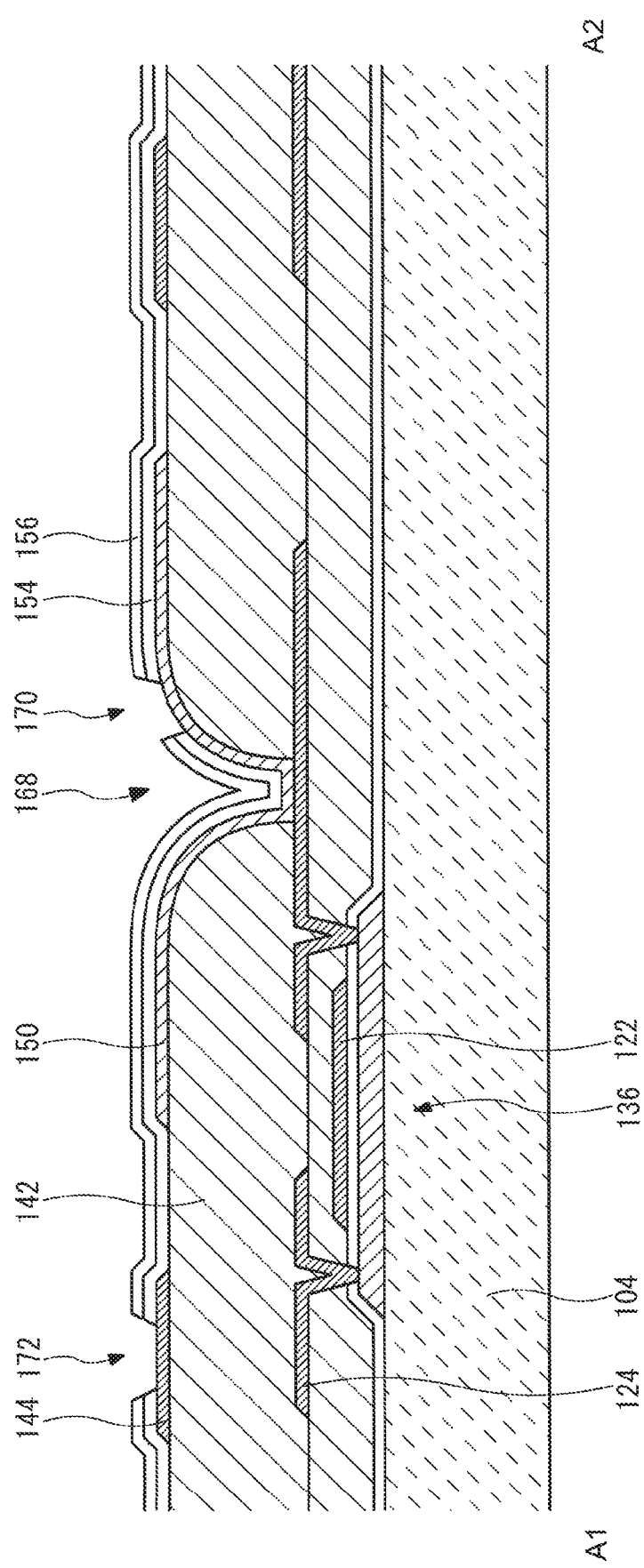
FIG. 19A is a cross-sectional view illustrating a method for manufacturing a pixel of a display device according to an embodiment of the present invention.
Figure 19B:
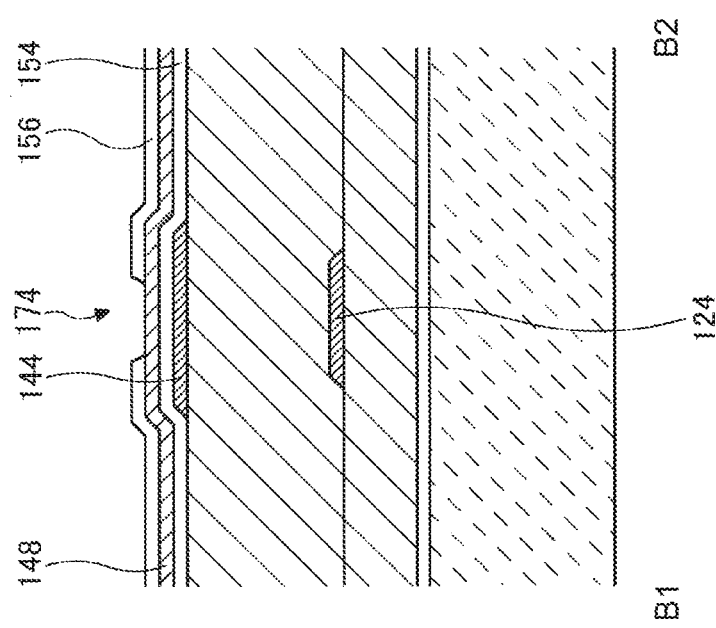
FIG. 19B is a cross-sectional view illustrating a method for manufacturing a pixel of a display device according to an embodiment of the present invention.

Next, a second inorganic insulating layer 156 that covers the plurality of pixels 110 is formed above the second conductive layer 148 (FIGS. 18A and 18B). The second inorganic insulating layer 156 may be made of the same material and formed by the same method as the aforementioned first inorganic insulating layer 154.

Next, in each of the plurality of pixels 110, a second contact hole 170 that reaches the second conductive layer 148 is formed. Furthermore, along with the formation of the second contact hole 170, a third contact hole 172 that reaches the first metal layer 144 and a fourth contact hole 174 that reaches the second conductive layer 148 are formed in each of the plurality of pixel groups 111 (see FIGS. 19A and 19B). That is, the second contact hole 170 and the third contact hole 172 are both bored through the first inorganic insulating layer 154 and the second inorganic insulation layer 156. Meanwhile, the fourth contact hole 174 is bored through only the second inorganic insulating layer 156.

Note here that a third conductive layer 146 functions as an etching stopper for the formation of the second contact hole 170, that the first metal layer 144 functions as an etching stopper for the formation of the third contact hole 172, and that the second conductive layer 148 functions as an etching stopper for the formation of the fourth contact hole 174. Therefore, the second contact hole 170, the third contact hole 172, and the fourth contact hole 174, which are bored through different layered structures as mentioned above, can be simultaneously formed in a single photolithography step. Further, since the second conductive layer 148 functions as an etching stopper, the diameter of the fourth contact hole 174 in the second inorganic insulating layer 156 is comparatively larger than the diameter of the second contact hole 170 and the diameter of the third contact hole 172. Further, since the first organic insulating layer 142 is a thicker film than the first inorganic insulating layer 154 and the second inorganic insulating layer 156, the diameter of the first contact hole 168 is comparatively larger than the diameters of the other contact holes (170, 172, and 174). The second contact hole 170 and the third contact hole 172, which are formed under the same conditions, are substantially equal in diameter to each other.

Note here that the area of the first contact hole 168 is an area where the first organic insulating layer 142 has an opening for the drain of the switching element 136 and where the drain of the switching element 136 and the first conductive layer 150 make contact with each other. Further, the area of the second contact hole 170 is an area where the first inorganic insulating layer 154 has an opening for the first conductive layer 150 and where the third conductive layer 146 and the first conductive layer 150 make contact with each other. Further, the area of the third contact hole 172 is an area where the first inorganic insulating layer 154 has an opening for the first metal layer 144 and where the third conductive layer 146 and the first metal layer 144 make contact with each other. Further, the area of the forth contact hole 174 is an area where the second inorganic insulating layer 156 has an opening for the second conductive layer 148 and where a fourth conductive layer 152 and the second conductive layer 148 make contact with each other.

Figure 20A:
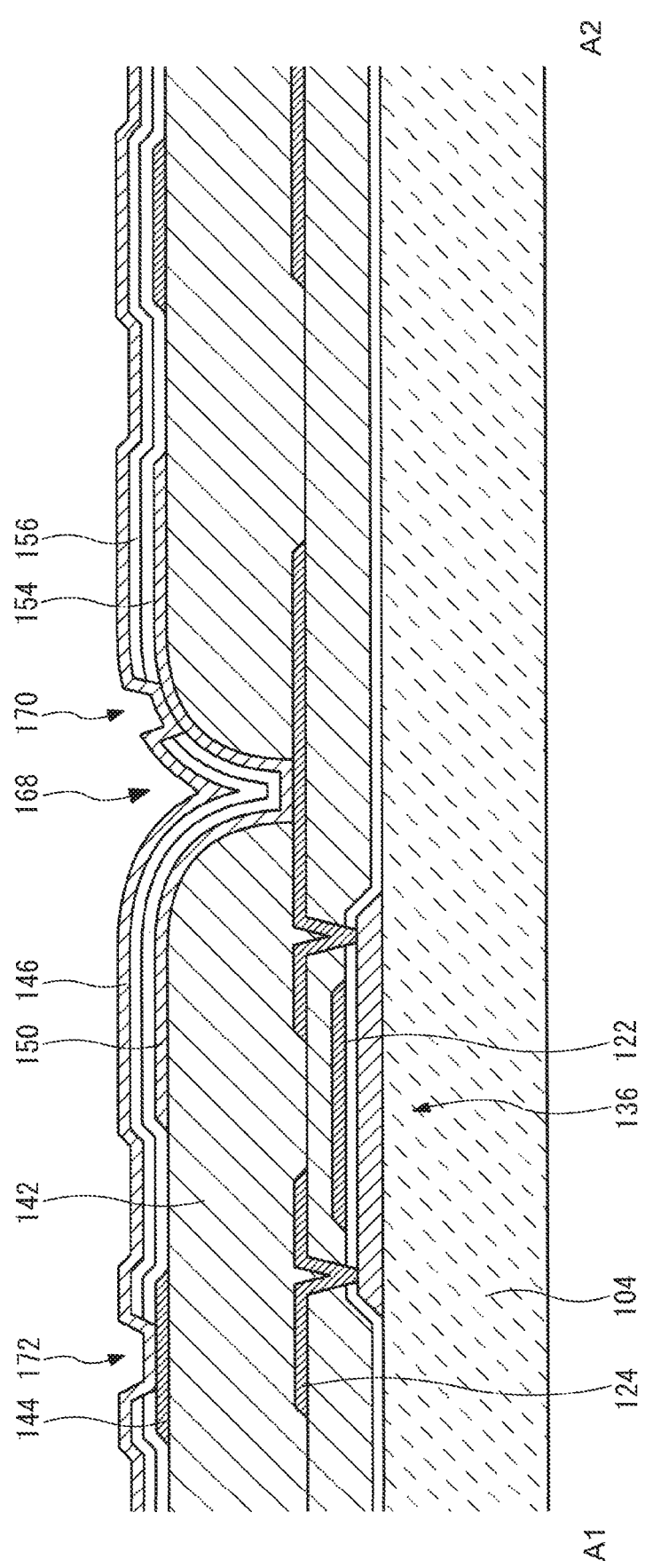
FIG. 20A is a cross-sectional view illustrating a method for manufacturing a pixel of a display device according to an embodiment of the present invention.
Figure 20B:
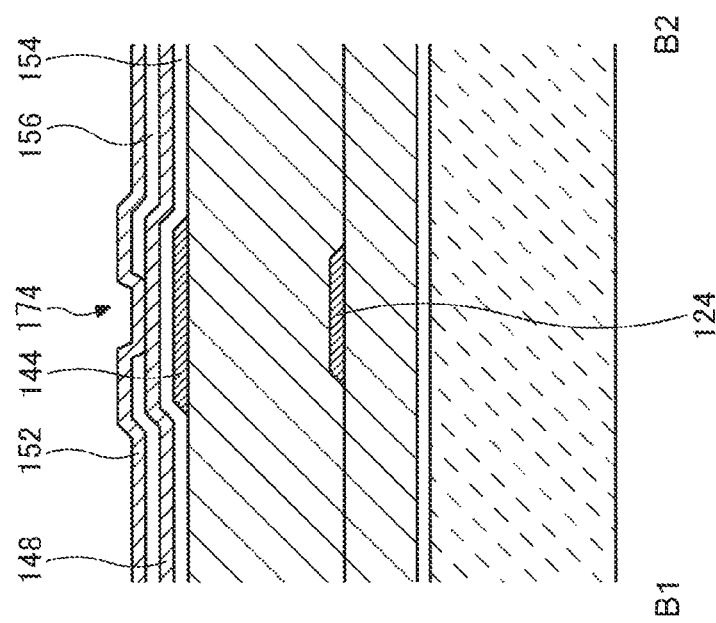
FIG. 20B is a cross-sectional view illustrating a method for manufacturing a pixel of a display device according to an embodiment of the present invention.
Figure 21A:
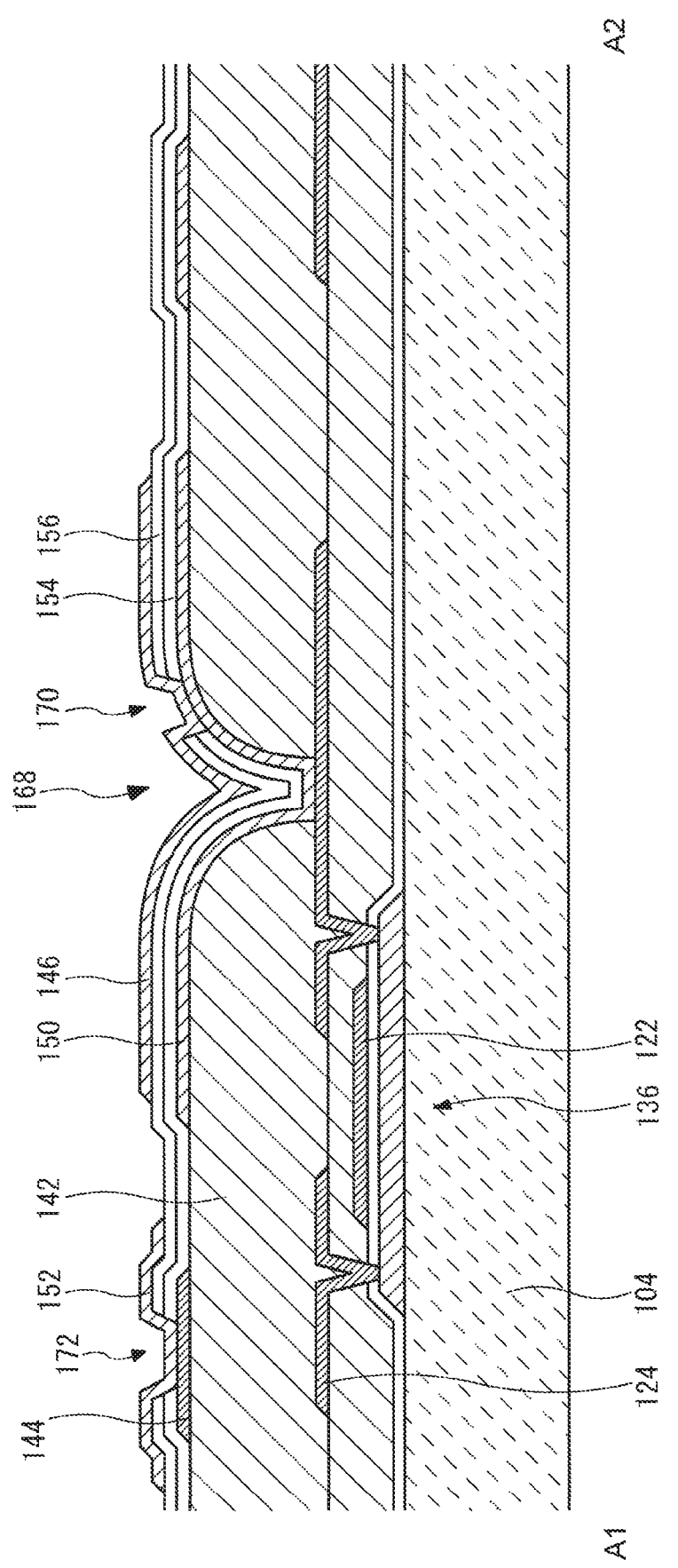
FIG. 21A is a cross-sectional view illustrating a method for manufacturing a pixel of a display device according to an embodiment of the present invention.
Figure 21B:
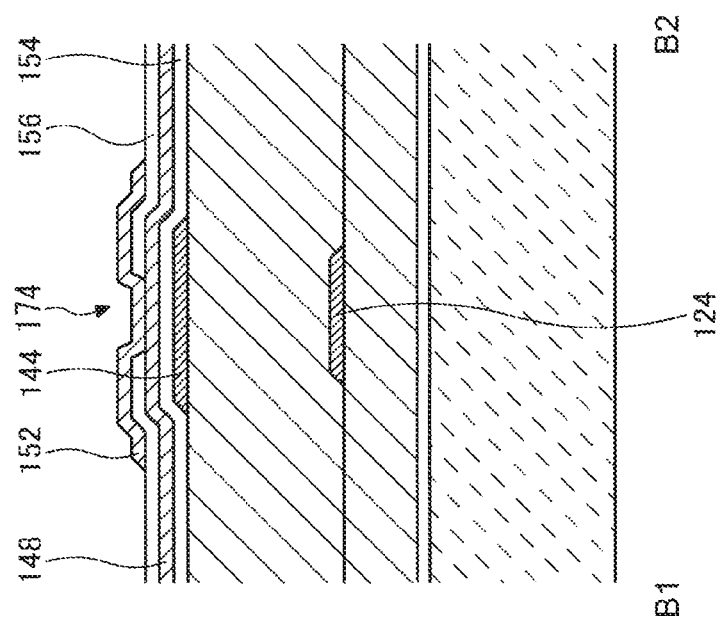
FIG. 21B is a cross-sectional view illustrating a method for manufacturing a pixel of a display device according to an embodiment of the present invention.

Next, a third conductive layer 146 connected to the first conductive layer 150 via the second contact hole 170 is formed above the second inorganic insulating layer 156 in each of the plurality of pixels 110 (FIGS. 20A and 20B). Next, a fourth conductive layer 152 connected to the first metal layer 144 via the third contact hole 172 and connected to the second conductive layer 148 via the fourth contact hole 174 is formed in each of the plurality of pixel groups 111 by a photolithography step so as to be separate from the third conductive layer 146 (FIGS. 21A and 21B).

The fourth conductive layer 152 is provided above the second inorganic insulating layer 156 in each of the plurality of pixel groups 111. Furthermore, the fourth conductive layer 152 is connected to any of a plurality of the first metal layers 144 via a third contact hole 172 and connected to the second conductive layer 148 via the fourth contact hole 174. That is, the second conductive layer 148 is connected to the first metal layer 144 via the fourth conductive layer 152. The fourth conductive layer 152 is rectangular in the present embodiment, and the fourth conductive layer 152, the fourth contact hole 174, and the third contact hole 172 overlap a light-blocking layer of a counter substrate.

As mentioned above, the second conductive layer 148 is a layer that functions as the touch detection electrodes 135 in the touch drive mode. Further, the first metal layer 144 is a layer that functions as the touch signal lines 127 in the touch drive mode. Therefore, such a manufacturing method as that described above makes it possible to connect the touch detection electrodes 135 and the touch signal lines 127 to each other via the fourth conductive layer 152.

A case is under consideration here where, as has been conventionally done, the second conductive layer 148 (common electrodes 134 or touch detection electrodes 135) is directly connected to the first metal layer 144 (common potential lines 126 or touch signal lines 127) instead of being connected to the first metal layer 144 (common potential lines 126 or touch signal lines 127) via the fourth conductive layer 152 as in the case of the present embodiment. In such a case, there is a need for a step in which a contact hole that reaches the first metal layer 144 is formed in the first inorganic insulating layer 154 after the formation of the first inorganic insulating layer 154 and before the formation of the second conductive layer 148. The subsequent formation of the second conductive layer 148 causes the second conductive layer 148 to be connected to the first metal layer 144 via the contact hole.

A manufacturing method such as that according to the present embodiment makes it possible to omit the aforementioned step, thus making it possible to suppress the rise in the number of masks needed and suppress the rise in the number of photolithography steps.

The foregoing has described a method for manufacturing a display device 100 according to the present embodiment. The method for manufacturing a display device 100 according to the present embodiment makes it possible to suppress the rise in the number of masks needed and suppress the rise in the number of photolithography steps.

While embodiments of the present invention have been described above, the present invention is not limited to the embodiments described above but may be applied in many variations without departing from the spirit of the present invention, and it is needless to say that such variations are encompassed in the scope of the present invention.

What is claimed is:

1. A display device comprising:
   a substrate;
   an organic insulating layer above the substrate;
   a first inorganic insulating layer on the organic insulating layer;
   an alignment film covering the first inorganic insulating layer;
   a switching element of a pixel between the substrate and the organic insulating layer;
   a video signal line connected to the switching element, and provided between the substrate and the organic insulating layer;
   a metal line extending parallel to the video signal line above the video signal line, and provided between the organic insulating layer and the first inorganic insulating layer;
   a first pixel electrode connected to the switching element, and provided between the organic insulating layer and the first inorganic insulating layer; and
   touch detection electrodes arranged in a matrix, and provided between the first inorganic insulating layer and the alignment film,
   wherein
   the touch detection electrodes have a first touch detection electrode, the first ouch detection electrode connects to the metal line,
   the first pixel electrode faces to the first touch detection electrode, and the metal line is separated from the first pixel electrode.

2. The display device according to claim 1, wherein
   the organic insulating layer has a first surface,
   the first inorganic insulating layer has a second surface,
   the metal line and the first pixel electrode contact on the first surface of the organic insulating layer, and
   the second surface of the first inorganic insulating layer contacts the first pixel electrode, the metal line, and the first surface of the first organic insulating layer.

3. The display device according to claim 1, further comprising:
   a second inorganic insulating layer between the first inorganic insulating layer and the alignment film; and
   a second pixel electrode between the second inorganic insulating layer and the alignment film, wherein
   the first pixel electrode connects to the second pixel electrode, and
   the first touch detection electrode is sandwiched between the first pixel electrode and the second pixel electrode.

4. The display device according to claim 3, further comprising:
   a transparent electrode between the second inorganic insulating layer and the alignment film, wherein
   the transparent electrode has a first part and a second part,
   the first part is connected to the metal line via a first hole formed in the first inorganic insulating layer and the second inorganic insulating layer,
   the second part is connected to the first touch detection electrode via a second hole formed in the second inorganic insulating layer, and
   a diameter of the second hole is larger than a diameter of the first hole.

5. The display device according to claim 3, wherein
   the second pixel electrode has a slit,
   the slit overlaps the touch detection electrode and the first pixel electrode, and
   the first pixel electrode is larger than the second pixel electrode.

6. The display device according to claim 5, wherein
   the first pixel electrode is connected to the switching element via a third hole formed in the organic insulating layer,
   the second pixel electrode is connected to the first pixel electrode via a fourth hole formed in the first inorganic insulating layer and the second inorganic insulating layer, and
   a diameter of the third hole is larger than a diameter of the fourth hole.

7. The display device according to claim 6, wherein
   the fourth hole is shifted from the third hole.

8. The display device according to claim 4, wherein
   a width of the metal line is larger than a width of the video signal line, and
   a width of the transparent electrode is larger than the width of the metal line.

9. The display device according to claim 4, wherein
   the transparent electrode overlaps the video signal line, and
   the first hole and the second hole overlap the video signal line.

* * * * *